United States Patent
Kincaid

(10) Patent No.: US 10,705,861 B1
(45) Date of Patent: Jul. 7, 2020

(54) PROVIDING USER INTERFACES BASED ON DATA SOURCE SEMANTICS

(71) Applicant: Tableau Software, LLC, Seattle, WA (US)

(72) Inventor: Robert Lloyd Kincaid, Half Moon Bay, CA (US)

(73) Assignee: Tableau Software, LLC, Seattle, WA (US)

( * ) Notice: Subject to any disclaimer, the term of this patent is extended or adjusted under 35 U.S.C. 154(b) by 0 days.

(21) Appl. No.: 16/368,390

(22) Filed: Mar. 28, 2019

(51) Int. Cl.
| | |
|---|---|
| *G06F 3/00* | (2006.01) |
| *G06F 9/451* | (2018.01) |
| *G06F 16/248* | (2019.01) |
| *G06F 16/2457* | (2019.01) |

(52) U.S. Cl.
CPC ............ *G06F 9/451* (2018.02); *G06F 16/248* (2019.01); *G06F 16/24578* (2019.01)

(58) Field of Classification Search
None
See application file for complete search history.

(56) References Cited

U.S. PATENT DOCUMENTS

| | | | |
|---|---|---|---|
| 2012/0233182 A1* | 9/2012 | Baudel | G06F 9/451 707/748 |
| 2017/0124617 A1* | 5/2017 | Spoelstra | G06Q 30/0621 |
| 2018/0232405 A1* | 8/2018 | Samara | G06F 16/25 |
| 2019/0129964 A1* | 5/2019 | Corbin, II | G06F 40/279 |
| 2019/0213608 A1* | 7/2019 | Ouyang | G06F 16/24568 |

OTHER PUBLICATIONS

S.Negash, "Business Intelligence," 2004, Communications of the Association for Information systems, vol. 13, pp. 177-195.
Eckerson, "Perfomance Dashboards Measuring, Monitoring, and Managing your Business," 2012, Business Book Summaries, pp. 1-11.
S. Lizotte-Latendresse et al., "Implementing Self-Service Business Analytics Supporting Lean Manufacturing: A State-Of-The-Art Review," 2018, 16th IFAC Symposium-Incom, pp. 1-6.
Groger, "The Operational Process Dashboard for Manufacturing," 2013, SciVerse ScienceDirect, pp. 205-210.
Yigitbasioglu, "A Review of Dashboards in Performance Management: Implications for Design and Research," 2012, International Journal of Accounting Informational Journal of Accounting Information Systems, vol. 13, pp. 41-59.

(Continued)

*Primary Examiner* — Thanh T Vu
(74) *Attorney, Agent, or Firm* — John W. Branch; Lowe Graham Jones PLLC

(57) ABSTRACT

Embodiments are directed to managing user interfaces. User interface (UI) models associated with concepts may be provided such that the UI models include visualizations. Other concepts may be associated with a data model based on fields of the data model. Characteristics of the concepts associated with each UI model and the other concepts associated with the data model may be compared to each other such that results of each comparison may be employed to generate a score for each UI model. The UI models may be ordered based on each score. A report that includes a rank ordered list of the UI models may be provided.

32 Claims, 26 Drawing Sheets

(56) References Cited

OTHER PUBLICATIONS

F. Adam, "Developing Practical Decision Support Tools Using Dashboards of Information," 2008, Springer Berlin Heidelberg, pp. 151-173.
Passlick, "A Self-Service Supporting Business Intelligence and Big Data Analytics Architecture," 2017, Proceedings der 13. Internationalen Tagung Wirtschaftsinformatik, pp. 1126-1140.
Shneiderman, "The Eyes Have It: A Task by Data Type Taxonomy for Information Visualizations," 1996, Proc. Visual Languages, pp. 1-9.
Alpar, "Self-Service Business Intelligence," 2016, Springer Fachmedien Wiesbaden, pp. 151-155.
Kaur, "A Review on Visualization Recommendation Strategies," 2017, In Proceedings of the 12th International Joint Conference on Computer Vision, Imaging and Computer Graphics Theory and Applications, vol. 3, pp. 266-273.
Hoang, "Dashboard by-Example: A Hypergraph-Based Approach to On-demand Data Warehousing Systems," 2012, IEEE International Conference on Systems, Man, and Cybernetics, pp. 1853-1858.
Zhang, "Ad Hoc Table Retrieval using Semantic Similarity," 2018, Creative Commons CC by 4.0 License, pp. 1553-1562.
Key, "VizDeck: Self-Organizing Dashboards for Visual Analytics," 2012, SIGMOD International Conference on Management of Data, pp. 681-684.
Mackinlay, "Automating the Design of Graphical Presentations of Relational Information," ACM Transactions on Graphics, vol. 5, No. 2, pp. 110-141.
Touma, "Supporting Data Integration Tasks with Semi-Automatic Ontology Construction," pp. 89-98.
Mazumdar, "A Knowledge Dashboard for Manufacturing Industries," 2012, Springer-Verlag Berlin Heidelberg, pp. 112-124.
Matera, "Peudom: A Mashup Platform for the End User Development of Common Information Spaces," 2013, Springer-Verlag Berlin Heidelberg, pp. 494-497.
Theorin, "An Event-Driven Manufacturing Information system Architecture," 2015, Diva, pp. 1-9.
Lennerholt, "Implementation Challenges of Self Service Business Intelligence: A Literature Review," 2018, Proceedings of the 51st Hawaii International Conference on System Sciences, pp. 5055-5063.
Elias, "Exploration Views: Understanding Dashboard Creation and Customization for Visualization Novices," 2011, Part IV, LNCS 6949, pp. 274-291.
Buccella, "Ontology-Based Data Integration Methods: A Framework for Comparison," pp. 1-24.
Roberts, "State of the Art: Coordinated & Multiple Views in Exploratory Visualization," 2007, IEEE Computer Society Press pp. 61-71.
Palpanas, "Integrated Model-Driven Dashboard Development," 2007, Springer Science, pp. 1-14.
Resnick, "Building the Executive Dashboard," 2003, Proceedings of the Human Factors and Ergonomics Society 47th Annual Meeting, pp. 1639-1643.
Sarikaya, "What Do We Talk About When We Talk About Dashboards?," 2018, DOI 10.1109/TVCG.2018.2864903, IEEE Transactions on Visualization and Computer Graphics, pp. 1-11.
Claire, "Ontology-based Approach for Information Fusion," 2003, Proceedings of the sixth international conference on information fusion, vol. 1, pp. 522-529.
Park, "A Blended Metric for Multi-label Optimisation and Evaluation," 2019, Energy Transfer Processes in Polynuclear Lanthanide Complexes, pp. 719-734.
Kintz, "A Semantic Dashboard Description Language for a Process-oriented Dashboard Design Methodology," 2012, 2nd International Workshop on Model-based Interactive Ubiquitous Systems, pp. 1-6.
Bergamaschi, "A Semantic Approach to ETL Technologies," 2011, Journal Data & Knowledge Engineering, vol. 70, Issue 8, pp. 717-731.

* cited by examiner

| Concepts | Map Rules | Data Type | <...> |
|---|---|---|---|
| sales | [...] | quantity | [...] |
| sub_region | [...] | string | [...] |
| category | [...] | string | [...] |
| customer | [...] | string | [...] |
| date | [...] | datetime | [...] |
| region | [...] | string | [...] |
| ... | | | ... |

| Concepts | Map Rules | Data Type | <...> |
|---|---|---|---|
| make | [...] | string | [...] |
| model | [...] | string | [...] |
| year | [...] | string | [...] |
| sell price | [...] | currency | [...] |
| cost price | [...] | currency | [...] |
| date | [...] | datetime | [...] |
| region | [...] | string | [...] |
| sub_region | [...] | string | [...] |
| ... | | | ... |

| Concept | Data Model Field | <...> |
|---|---|---|
| concept A | Field X | [...] |
| concept B | Field Y | [...] |
| concept C | Field Z | [...] |
| ... | ... | ... |

*Fig. 12*

1: $\mathcal{F} \leftarrow \{f_0, f_1, f_2, \ldots, f_n\}$, a collection of model fields
2: $\mathcal{C} \leftarrow \{C_0, C_1, C_2, \ldots, C_n\}$, a collection of domain vocabularies
3: $\mathcal{D} \leftarrow \{\}$, an collection of domain mappings
4: for each concept $c \in \mathcal{C}$ do
5:    $D \leftarrow \{\}$
6:    for each field $f \in \mathcal{F}$ do
7:      if field $f$ maps to concept $c$ then
8:        add $f$ to $D$ with key $c$
9:      end if
10:   end for
11:   if $D$ not empty then
12:     add $D$ to $\mathcal{D}$
13:   end if
14: end for

*Fig. 13*

1: $\mathcal{M} \leftarrow \{M_0, M_1, M_2, \ldots, M_n\}$, a collection of domain mappings
2: $\mathcal{D} \leftarrow \{D_0, D_1, D_2, \ldots, D_m\}$, a collection of UI models
3: $l \leftarrow ()$, an empty list
4: for each $M \in \mathcal{M}$ do
5: $\quad m \leftarrow$ unique concepts in $M$
6: $\quad$ for each $D \in \mathcal{D}$ do
7: $\quad\quad d \leftarrow$ unique concepts in $D$
8: $\quad\quad i \leftarrow |m \cap d|$
9: $\quad\quad j \leftarrow |m \cap d|/|m \cup d|$
10: $\quad\quad n \leftarrow |$satisfiable plots in $\mathcal{T}|$
11: $\quad\quad$ append $(M, D, i, j, n)$ to $l$
12: $\quad$ end for
13: end for
14: sort $l$ descending by $(i, j, n)$
15: using $M, D$ from $l_0$ render dashboard

*Fig. 14*

PROVIDING USER INTERFACES BASED ON DATA SOURCE SEMANTICS

TECHNICAL FIELD

The present invention relates generally to user interfaces, and more particularly, but not exclusively to, automatically providing user interfaces based on associated data models.

BACKGROUND

Organizations are generating and collecting an ever-increasing amount of data. This data may be associated with disparate parts of the organization, such as, consumer activity, manufacturing activity, customer service, network activity logs, big data, or the like. In some cases, the quantity and dissimilarity of data associated with an organization may make it difficult to effectively utilize available data to improve business practices, provide useful business intelligence, or otherwise reason about their data. Accordingly, in some cases, organizations may employ computer-based applications or tools to generate user interfaces, such as, dashboards that may provide visualizations, or the like, to help enable improved reasoning about some or all of their data. In some cases, dedicated or custom user interfaces, such as, custom designed dashboards, or the like, may be advantageous for enabling organizations to improve their capability to reason about their data. However, crafting user interfaces that incorporate or otherwise depend on data from a variety of data sources within an organization may require prohibitively deep domain knowledge or design skills. Also, in some cases, effective dashboards may be closely tailored to the underlying data sources such that they may require significant customization which may preclude reuse even across similar domains in the same organization. Thus, it is with respect to these considerations and others that the present innovations have been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein:

FIG. 12 illustrates a logical schematic of a portion of a concept engine for mapping data model fields to concepts in accordance with one or more of the various embodiments;

FIG. 13 illustrates a portion of a logical description of mapping process for mapping data model fields to concepts in accordance with one or more of the various embodiments;

FIG. 14 illustrates a portion of logical description of a ranking process for ranking user interface models based on how well they match a data source in accordance with one or more of the various embodiments;

DETAILED DESCRIPTION OF VARIOUS EMBODIMENTS

Figure 1:
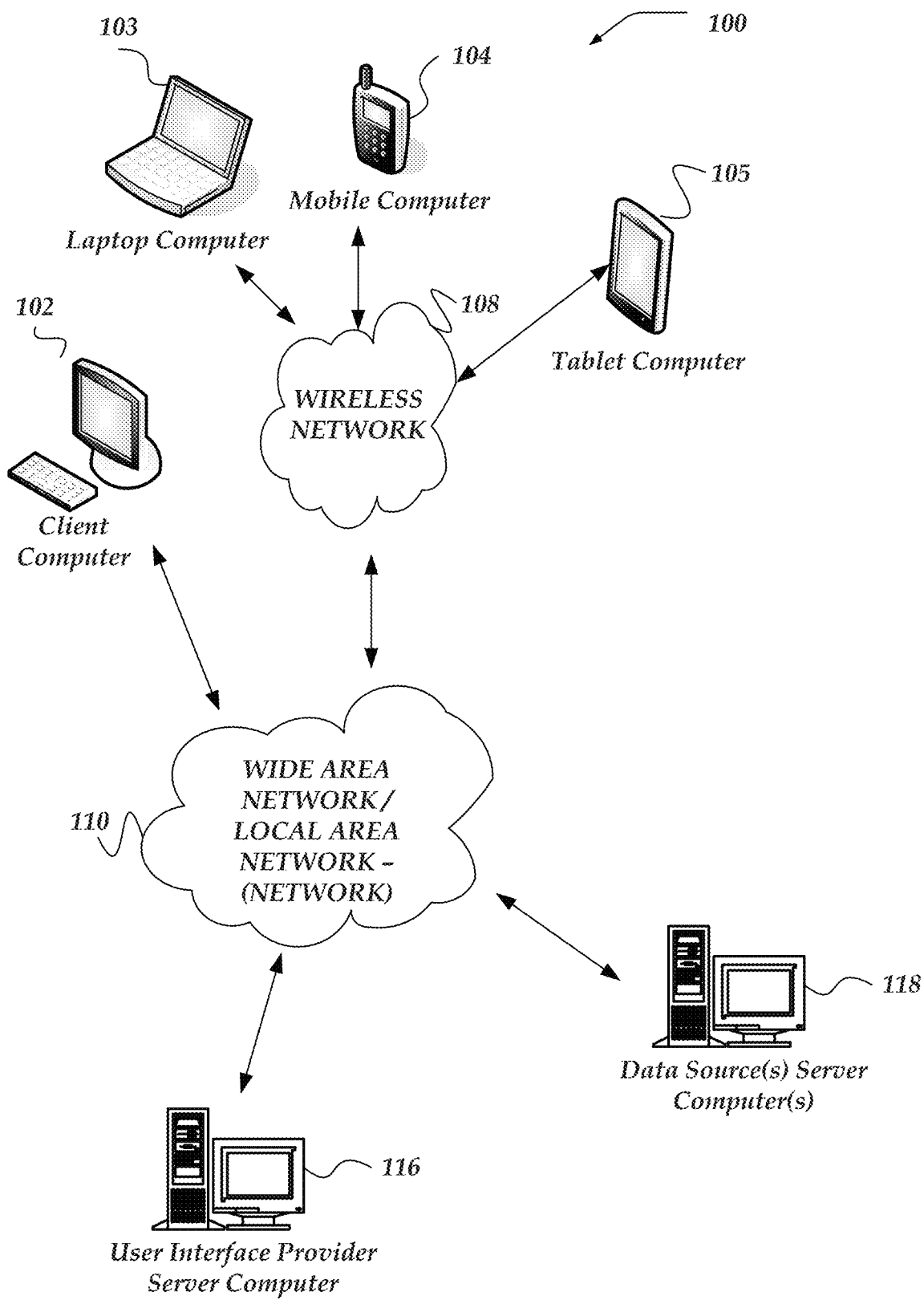
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the term "data source" refers to databases, applications, services, file systems, or the like, that store or provide information for an organization. Examples of data sources may include, RDBMS databases, graph databases, spreadsheets, file systems, document management systems, local or remote data streams, or the like. In some cases, data sources are organized around one or more tables or table-like structure. In other cases, data source be organized as a graph or graph-like structure.

As used herein the term "data model" refers to one or more data structures that provide a representation of an underlying data source. In some cases, data models may provide views of a data source for particular applications. Data models may be considered views or interfaces to the underlying data source. In some cases, data models may map directly to a data source (e.g., practically a logical pass through). Also, in some cases, data models may be provided by a data source. In some circumstances, data models may be considered interfaces to data sources. Data models enable organizations to organize or present information from data sources in ways that may be more convenient, more meaningful (e.g, easier to reason about), safer, or the like.

As used herein, the term "data model field" refers to named or nameable properties or features of a data model. Data model fields are analogous to columns in a database tables, nodes in a graph, Java class attributes, and so on. For example, a data model that corresponds to an employee database table, may have data model fields, such as, name, email-address, telephone-number, employee-id, or the like.

As used herein the term "data object" refers to one or more entities or data structures that comprise data models. In some cases, data objects may be considered portions of the data model. Data objects may represent individual instances of items or classes or kinds of items.

As used herein, the terms "concept," or "domain concepts" refer to ideas that are included in one or more formal or informal ontologies. Herein, data model fields are mapped to concepts that have a similar meaning. Thus, fields having different labels or names may be mapped to a common ontology. Domain concepts are concepts that have a meaning based on an association with a particular domain.

As used herein the term "graph model" refers to one or more data structures that may be comprised of one or more nodes and one or more edges to represent data objects and relationships between or among them. Nodes may be associated with one or more data objects and edges may be associated with one or more relationships between the data objects. Graph models may be considered specialized data models.

As used herein, the term "user interface model" refers to one or more data structures that provide an analytical representation interface information that a user interface engine may employ to generate a user interface. User interface models include rules or other information that describe the user interface components that should be included in a user interface. This may include layout information, styling information, or the like. Also, user interface models include or define an association with one or more concepts. Also, user interface models define where or how data/values corresponding to the associated concepts are applied in a generated user interface.

As used herein, the term "concept slots" refer are data structures that are employed to associate concepts with user interface models. User interface models that are associated with a set of concepts have concept slots that correspond to the associated concepts.

As used herein, the terms "dashboard interface model," or "dashboard model" refer to one or more user interface models that are specialized for representation dashboard user interface. Conventionally, dashboard user interfaces present a collection of semantically related visualizations that enable users to quickly "see" information that may be important to an organization or its operation. The particular visualizations that comprise a given dashboard user interface may vary depending the domain or purpose of the dashboard.

As used herein the term "panel" refers to region within a graphical user interface (GUI) that has a defined geometry (e.g., x, y, z-order) within the GUI. Panels may be arranged to display information to users or to host one or more interactive controls. The geometry or styles associated with panels may be defined using configuration information, including dynamic rules. Also, in some cases, users may be enabled to perform actions on one or more panels, such as, moving, showing, hiding, re-sizing, re-ordering, or the like.

As used herein the term "configuration information" refers to information that may include rule based policies, pattern matching, scripts (e.g., computer readable instructions), or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing user interfaces. In one or more of the various embodiments, one or more user interface (UI) models that are each associated with one or more concepts having one or more characteristics may be provided such that the one or more UI models include one or more visualizations. In one or more of the various embodiments, providing the one or more UI models may include providing one or more dashboard models that each include two or more visualizations such that the two or more visualizations may be associated with different information or metrics that may be further associated with one or more specific analytical objectives. In one or more of the various embodiments, providing the one or more UI models may include: providing one or more domains that are associated with one or more domain concepts; associating each of the one or more UI models with one or more of the one or more domains; associating the one or more UI models with a portion of the one or more domain concepts based on the one or more domains that may be associated with the one or more UI models; or the like.

In one or more of the various embodiments, one or more other concepts having the one or more characteristics may be associated with a data model based on one or more fields of the data model. In one or more of the various embodiments, associating the one or more concepts with the data model, may include: comparing each field of the data model to a plurality of concepts based on one or more characteristics of each field such that the one or more characteristics, include one or more of a label of a field, or a data type of a field; associating a concept associated with the comparison to a compared field associated with the comparison of each field; or the like.

In one or more of the various embodiments, the one or more characteristics of the one or more concepts associated with each UI model and the one or more other concepts associated with the data model may be compared to each other such that one or more results of each comparison is employed to generate a score for each of the one or more UI models. In one or more of the various embodiments, generating the score for each of the one or more UI models may include: determining a first portion of the score based on a cardinality of an intersection of one or more unique concepts shared by the one or more data models and the one or more UI models; determining a second portion of the score based on a normalized measure of an intersection between the one or more other concepts associated with the data model and the one or more concepts associated with each UI model; determining a third portion of the score based on a number of visualizations in the one or more UI models that correspond to the one or more other concepts associated with the data model; or the like.

In one or more of the various embodiments, the one or more UI models may be ordered based on each score.

In one or more of the various embodiments, a report that includes a rank ordered list of the one or more UI models may be provided.

In one or more of the various embodiments, a UI model may be determined based on the ordering of the one or more UI models; and in some embodiments, a UI engine may be instantiated to perform actions, including: generating a UI based on the determined UI model; binding a portion of the one or more fields of the data model to one or more attributes of the one or more visualizations based on a concept associated with each of the portion of the one or more fields such that the concept may also be associated with one or more slots in the UI model that may correspond to the one or more attributes; rendering the one or more visualizations for display in the UI based on the data model such that the one or more attributes are populated using information from the data source that may associated with the portion of the one or more fields; or the like.

In one or more of the various embodiments, one or more compound UI models that each include one or more UI sub-models may be provided; a sub-score for each of the one or more sub-UI models may be provided based on a comparison of each concept associated with each UI sub-model and the one or more other concepts associated with the data model; the score for the one or more compound UI models may be provided based on the one or more sub-scores; or the like.

In one or more of the various embodiments, a weight value may be associated with the one or more concepts based on a relative importance of the one or more concepts; a portion of the one or more concepts may be associated with the one or more visualizations; a UI engine may be instantiated to generate a UI that styles one or more of a position, appearance or geometry of the one or more visualizations in the UI based on the weight value that may be associated with each of the portion of the one or more concepts.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)-(network) 110, wireless network 108, client computers 102-105, user interface provider server computer 116, data source server computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CS S), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, user interface provider server computer 116, data source server computer 118, or other computers.

Client computers 102-105 may further be configured to include a client application that enables an end-user to log into an end-user account that may be managed by another computer, such as user interface provider server computer 116, data source server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by user interface provider server computer 116 or data source server computer 118.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HS-DPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, user interface provider server computer 116, data source server computer 118, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of user interface provider server computer 116 or data source server computer 118 are described in more detail below in conjunction with FIG. 3. Although FIG. 1 illustrates user interface provider server computer 116, data source server computer 118, or the like, each as a single computer, the innovations or embodiments are not so limited. For example, one or more functions of user interface provider server computer 116, data source server computer 118, or the like, may be distributed across one or more distinct network computers. Moreover, in one or more embodiments, user interface provider server computer 116 or data source server computer 118 may be implemented using a plurality of network computers. Further, in one or more of the various embodiments, user interface provide server computer 116, data source server computer 118, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
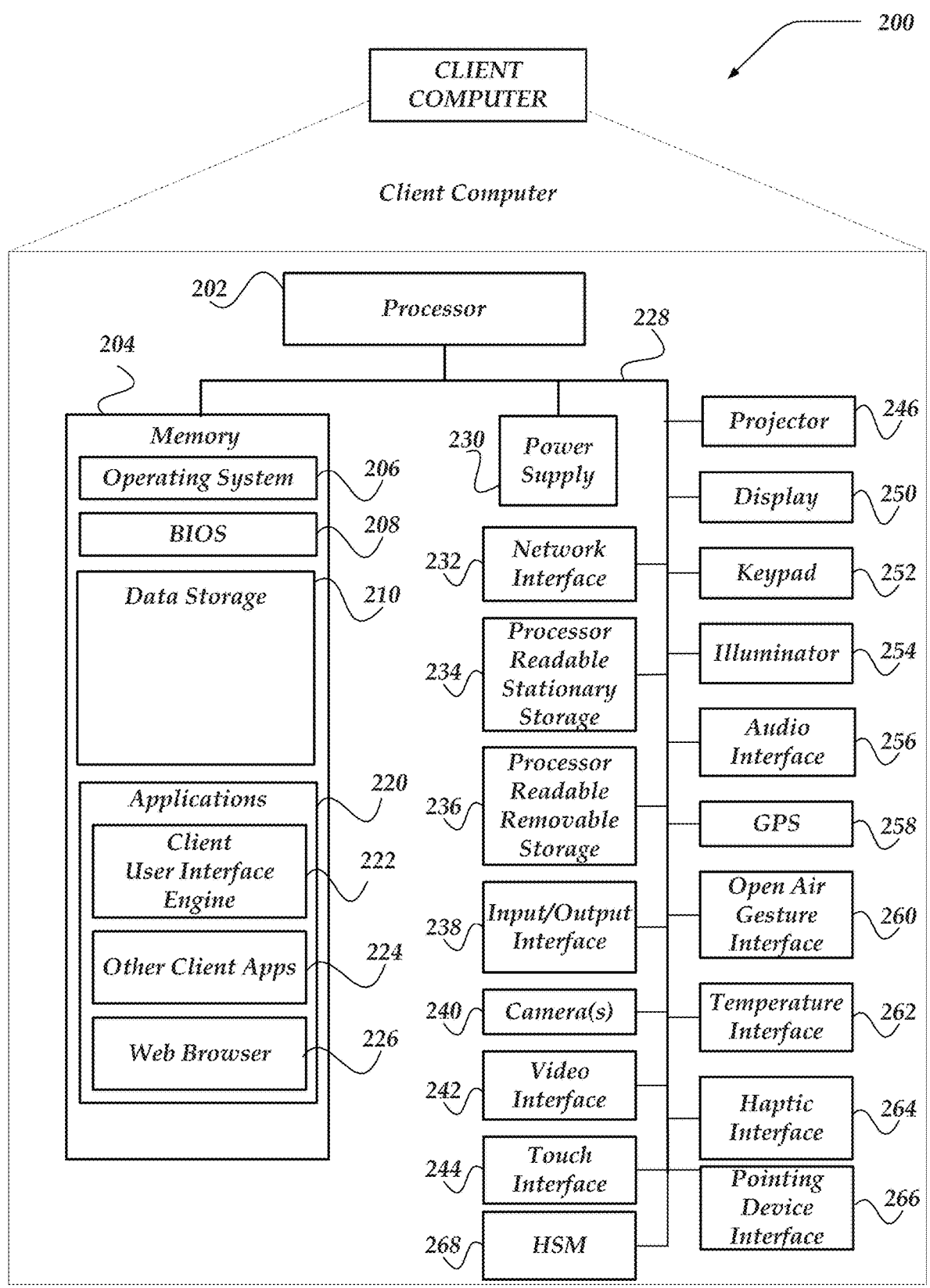
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in display objects, data models, data objects, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, client user interface engine 222, other client applications 224, web browser 226, or the like. Client computers may be arranged to exchange communications one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, visualization applications, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
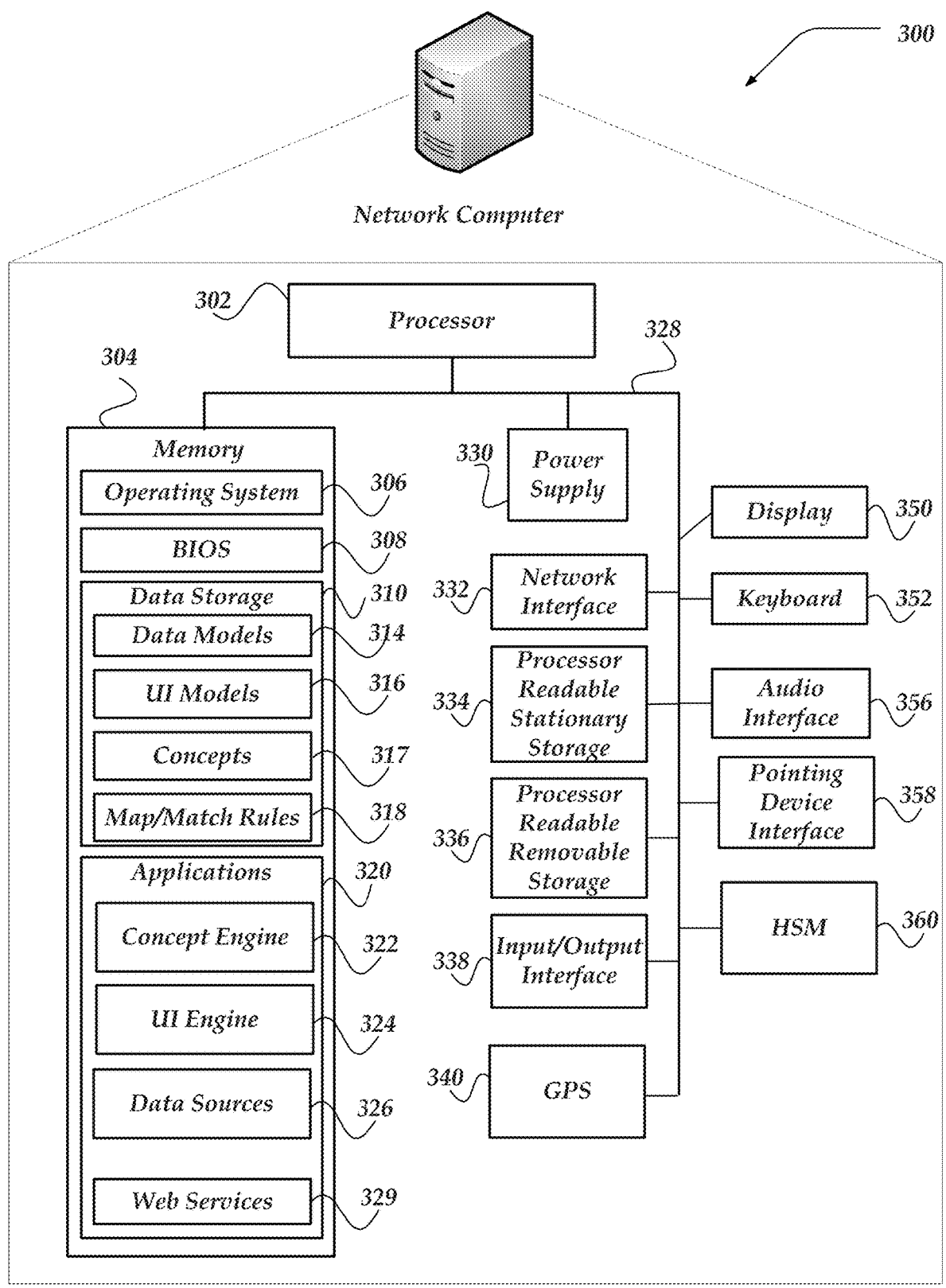
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of user interface provider server computer 116, data source server computer 118, or the like, of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, concept engine 322, user interface engine 324, data sources 326, web services 329, or the like, may be arranged to employ geo-location information to select one or more localization features, such as, time zones, languages, currencies, currency formatting, calendar formatting, or the like. Localization features may be used in user interfaces, dashboards, visualizations, reports, as well as internal processes or databases. In at least one of the various embodiments, geo-location information used for selecting localization information may be provided by GPS 340. Also, in some embodiments, geolocation information may include information provided using one or more geo-location protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's OSX® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, data models 314, user interface models 316, concepts 317, map or match rules 318, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include concept engine 322, user interface engine 324, data sources 326, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, concept engine 322, user interface engine 324, data sources 326, web services 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to concept engine 322, user interface engine 324, data sources 326, web services 329, or the like, may be provisioned and de-commissioned automatically.

Also, in one or more of the various embodiments, concept engine 322, user interface engine 324, data sources 326, web services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
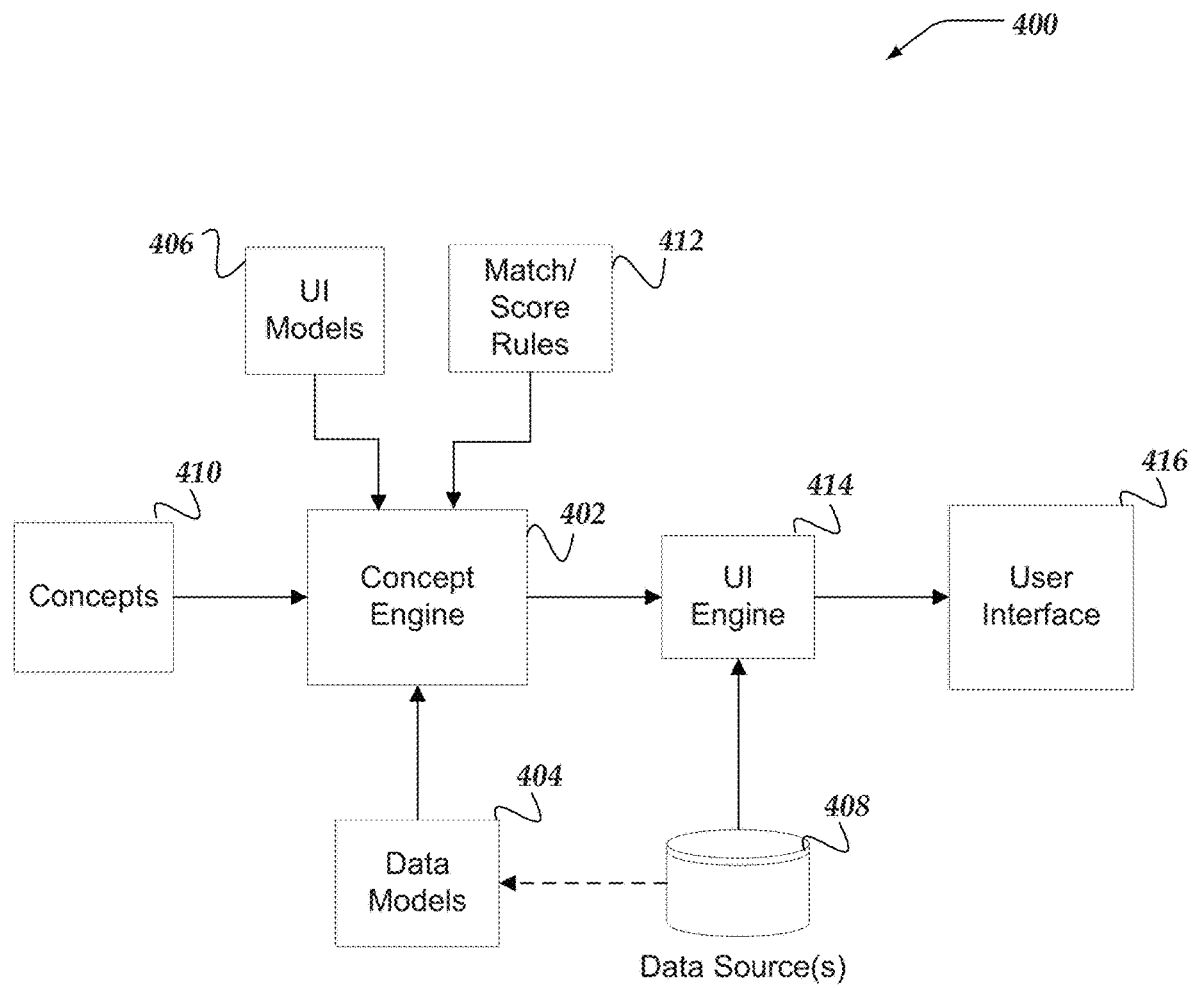
FIG. 4 illustrates a logical architecture of system for providing user interfaces based on data source semantics in accordance with one or more of the various embodiments.

FIG. 4 illustrates a logical architecture of system 400 for providing user interfaces based on data source semantics in accordance with one or more of the various embodiments. In one or more of the various embodiments, system 400 may be comprised of various components, including, concept engine 402, data models 404, user interface models 406, data sources 408, concepts 410, match/score rules 412, user interface engine 414, user interface 416, or the like.

In one or more of the various embodiments, concept engines, such as, concept engine 402 may be arranged to perform one or more actions to determine user interfaces that may be appropriate for a given data source or data sources. In some embodiments, this may be accomplished by comparing data models associated with data sources with user interface models by examining or comparing the concepts that may be shared between a data model and user interface models.

In some embodiments, concept engine 402 may be provided one or more data models, such as, data model 404 that are associated with one or more data sources, such as, data source 408. Accordingly, concept engine 402 may be arranged to map one or more fields of the data models (e.g., data model fields) to one or more domain concepts, such as, concepts 410. (Note, for brevity and clarity, domain concepts may be referred to as concepts.)

In one or more of the various embodiments, if data model 404 has been mapped to one or more concepts, concept engine 402 may be arranged to evaluate one or more user interface models to score and rank order them based on how they match the concepts mapped to the data model.

In one or more of the various embodiments, concept engines may be arranged to map data model fields to concepts by executing one or more match rules, such as, match/scoring rules 412. In one or more of the various embodiments, match rules may be comprised on heuristics, conditions, machine learning classifiers, pattern matching instructions, or the like, for determining if a given data model field matches a concept. In some embodiments, this determination may include generating a score value that represents how close a data model field may match a concept, such as, a Jaccard distance, or the like. Alternatively, in some of the embodiments, map rules may resolve to discrete or categorical values that may represent whether a field should be associated with a particular concept.

In one or more of the various embodiments, if data model 404 has been mapped or associated to one or more concepts, concept engine 402 may be arranged to examine one or more user interface models, such as, user interface models 406 to determine how well they match data model 404 based on a comparison of the concepts associated with data model 404 and the concepts that are associated with individual user interface models. Accordingly, concept engines may be arranged to execute one or more score rules to produce one or more scores that represents how close a user interface model matches a data model. In one or more of the various embodiments, this score may be based on the comparison of the concepts associated with the data model and the concepts that may be associated with the user interface models.

In one or more of the various embodiments, user interface engines, such as, user interface engine 414 may be arranged to generate, or otherwise, instantiate user interfaces based on one or more user interface models and data models. In some embodiments, user interfaces generated by a user interface engine may be populated with information based on a binding of one or more user interface slots to one or more data model fields. In some embodiments, user interface slots may be associated with concepts. Thus, in some embodiments, user interface slots that are associated with a concept may be bound to data model fields that are associate with the same concept. In one or more of the various embodiments, score rules may be comprised of heuristics, conditions, machine learning classifiers, pattern matching instructions, or the like, for determining a score that represents how well a user interface model matches a data model.

In one or more of the various embodiments, if the user interface models have been scored, concept engine 402 may be arranged to rank order the user interface models based on the match score. Accordingly, in some embodiments, a rank ordered list of the scored user interface models may be provided to one or more users that may be enabled to select a user interface model that may be provided to a user interface engine. Alternatively, in some embodiments, concept engines may be arranged to automatically select a highest scoring user interface model and provide it to the user interface engine.

In one or more of the various embodiments, user interface engines, such as user interface engine 414 may be arranged to generate a user interface based on the provided user interface model and data model 404. Accordingly, in some embodiments, the generated user interface may include one or more components or visualizations as defined in the user interface model that are populated or otherwise rendered based on information from data model 404 via data source 408.

In one or more of the various embodiments, one or more user interface models may be dashboard models that may be employed to generate dashboard user interfaces that enable users to visualize one or more key metrics, or the like, that may be of particular significance to them or their organization.

Further, in one or more of the various embodiments, data models, such as, data model 404 may be data structures, or the like, that provide one or more logical representations of the information stored in one or more data sources, such as, data source 408. In some embodiments, data models may include fields that correspond to fields or attributes in a data source. For example, in some embodiments, if data source 408 is a Relational Database System (RDBMS), a data model, such as, data model 404 may be comprised of one or more data model fields that correspond to column one or more tables of data model 404.

In one or more of the various embodiments, data models may be arranged to provide views or representations of a data source that may vary from an underlying data source. In some embodiments, this may include excluding one or more fields in the data source from the data model. Likewise, in some of the embodiments, a data model may provide an interface to a data source that may be different than the data source's native configuration. For example, in some embodiments, if data source 408 is a SQL based RDBMS, data model 404 may be arranged to present a GraphQL interface to the underlying information rather being restricted to tables with row and columns, or the like.

In some embodiments, dashboard user interfaces may be a common form of visual analytics that may often be employed in business intelligence applications, informatics, or industrial monitoring as well as many other domains or analytical tasks. In some embodiments, these visual displays may take many forms and styles based on the data acquired and the information needs of the viewer or analyst. In some cases, due to this variety, there may be a lack of consistent, agreed-to definitions for what constitutes a qualitydashboard visualization. Accordingly, it may be conventional to adopt a broad view of what can be considered a dashboard including infographics, narrative elements, or the like. Herein, for some embodiments, dashboard visualizations may be user interfaces that may be arranged to at least include a visual display of important information that may be needed to achieve one or more objectives; consolidated and arranged on a single screen so the information can be monitored at a glance. (See, FIG. 16)

In some embodiments, dashboard user interfaces may include a wide variety of user interfaces or visual analytics designs, including faceted or coordinated views (e.g., panels) that might not traditionally be considered a typical business intelligence dashboard based primarily on Key Performance Indicators (KPI). In some embodiments, beyond the obvious commonality of being a visual display designed for pre-attentive perception (e.g., at-a-glance), such dashboards or other user interfaces may be designed to achieve one or more specific analytical objectives. In some embodiments, this key element may typically require that these dashboards may be bespoke creations designed for domain or task specific purposes. Furthermore, in some embodiments, dashboards may be used to visually encode a wide variety of analytical objectives depending on the use case and the domain. For some various embodiments, in some cases, it may be difficult to automatically generate a dashboard user interface design because determining a user's analytical objectives and what data is most important to visualize may be difficult. Historically, for some embodiments, dashboards may be rooted in Executive Information Systems. Conventionally, these were often custom one-off creations and some early examples were dedicated stand-alone systems. While, in some cases, the emergence of general-purpose visualization tools has enabled end-users or hired consultants to self-assemble and publish dashboard visualizations. Even so, crafting effective dashboards may require skill, experience, time, or the like, that may require expert consultants which may cause costs to become prohibitive. Accordingly, in one or more of the various embodiments, automatically determining dashboards user interface based on a data source may be faster, simpler, or less costly than conventional manual dashboard design processes. Accordingly, in some embodiments, the innovations described herein may enable at least increased self-service or automatic creation of effective dashboards by a wider or less-skilled user base.

For example, in one or more of the various embodiments, a home user that might want dashboard-like displays of common data sources for personal use. For example, personal bank account transactions, non-professional stock trading and portfolio management, perhaps even tracking amateur sports data, such as, youth baseball, youth soccer, or the like. Since it would be quite common for these users to be inexperienced when it comes to visualization and dashboard design, the innovations described herein may be arranged to automatically generate dashboard user interfaces that may provide rich visual analytic displays of their personal data.

Also, in some embodiments, providing user interfaces or dashboards based on data source semantics may be applied to business-relevant domains that may have a limited focus. For example, in this circumstance, a particular business domain may be primarily based on a finite set of relevant data sources or subject domains. In such cases, the number of required data models or dashboard models might be limited and tractable. However, in this case, for some embodiments, the advantage provided may be that providing user interfaces based on data source semantics may enable an organization to be more robust to minor changes to the data sources, or the addition of new but domain-related data sources. For example, in this case, additional dashboard development might not be required because a concept engine may be arranged to discover one or more dashboard models that could adapt to changing field names or the inclusion of new concepts.

Figure 5:
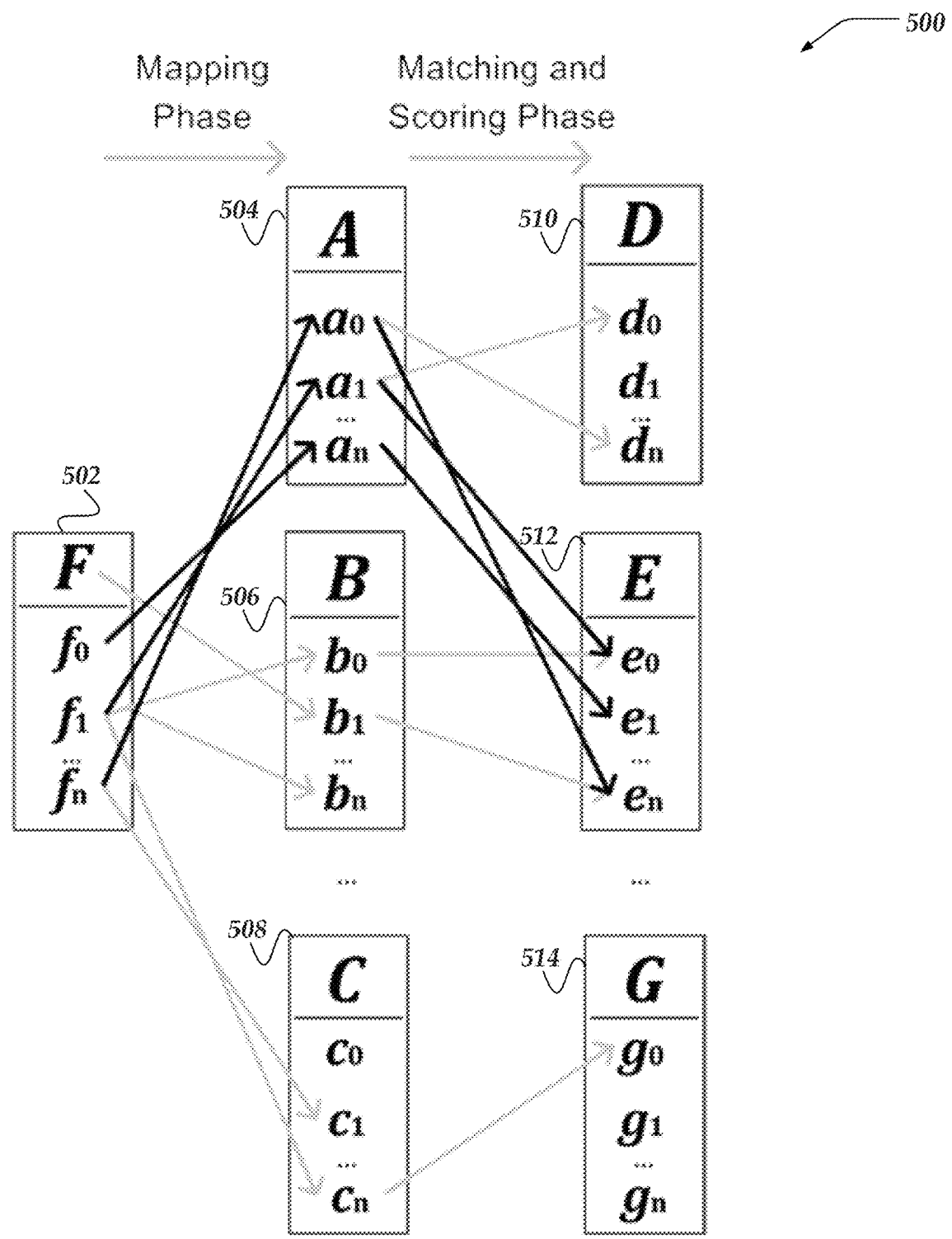
FIG. 5 illustrates a portion of logical architecture of a system for providing user interfaces based on data source semantics in accordance with one or more of the various embodiments.

FIG. 5 illustrates a portion of logical architecture of system 500 for providing user interfaces based on data source semantics in accordance with one or more of the various embodiments. In one or more of the various embodiments, concept engines may be arranged to map data model fields 502 to one or more concepts that may be grouped, or otherwise associated, with various domains, such as, domain concepts 504, domain concepts 506, domain concepts 508, or the like. Accordingly, in one or more of the various embodiments, concept engines may be arranged to map the implicated concepts to one or more data models, such as, data model 510, data model 512, data model 514, or the like.

Accordingly, in one or more of the various embodiments, concept engines may be arranged to evaluate or otherwise score the data models so they may be rank ordered based on how close they fit or overlap the concepts that the data model fields may be mapped to.

In this example, data model fields F 502 may be mapped into domains A 504, B 506 or C 508. Accordingly, in this example, the corresponding domain concepts (a0, a1, . . . an, and so on) may be mapped to matching concepts (indicated by arrows) in dashboard models D 510, E 512, G 514. In this example, an optimal path to dashboard model E 512 is denoted by bold arrows. Missing arrows indicate no matching concepts.

In some embodiments, concept engines may be arranged to perform one or more actions to domain mapping from data models to concepts. In some embodiments, this may include enumerating some or all possible interpretations of named data model fields from the data model to construct mappings of these data model fields to domain concepts.

In some embodiments, this may require a collection of concepts organized as a pre-defined ontology or knowledge-base of relevant domains and their concept vocabularies. In some embodiments, concept engines may be arranged to perform domain mappings that may be determined by analyzing meta-data associated with each data model field. In some embodiments, meta-data may include various properties associated with concepts, fields, concept values, field values, or the like, such as, expected cardinality (for categorical values), distribution and range (for quantitative values), one or more scagnostic measures (e.g., skew, or the like), field name, data type, or the like. In some embodiments, additional associated data may include, or some or all known or inferable relationships between fields. Accordingly, in some embodiments, this field information may be associated with compatible domains and concepts. For example, in some embodiments, a concept engine may be arranged to generate one or more domain dictionaries for each data model.

In some embodiments, this process may be considered a semantic entity extraction process where a data model may map to one or more putative domains with corresponding translations into the underlying concepts. For example, given a data model consisting of $\{f_0, f_1, f_2 \ldots f_n\}$ fields and a domain map consisting of concepts $\{c_0, c_1, c_2 \ldots c_n\}$ a concept engine may be arranged to find one or more appropriate $f_i$ to $c_k$ associations. In some embodiments, concept engines may be arranged to employ one or more predefined or supplied collections of such user interface models or dashboard models that cover a span of subject domains of interest to an organization or user. The output of this mapping phase is a collection of all putative data model to domain concept mappings for the data model.

Figure 6A:
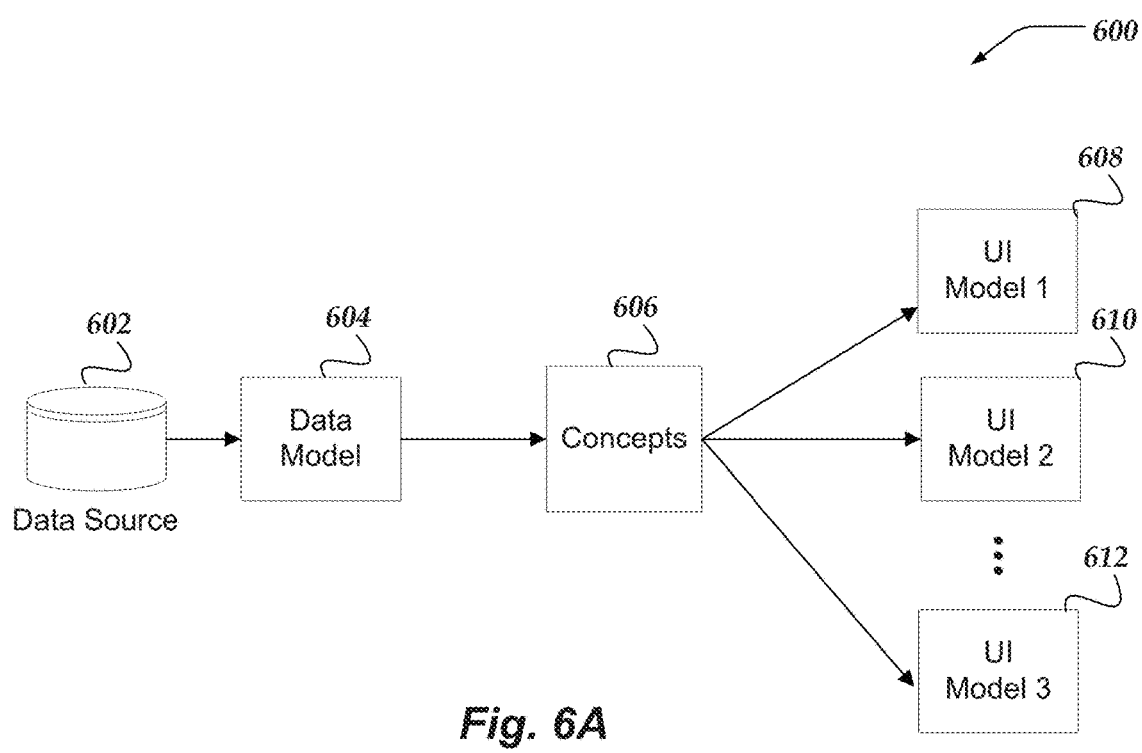
FIG. 6A illustrates a portion of a logical architecture for a system for providing user interfaces based on data source semantics in accordance with one or more of the various embodiments.
Figure 6B:
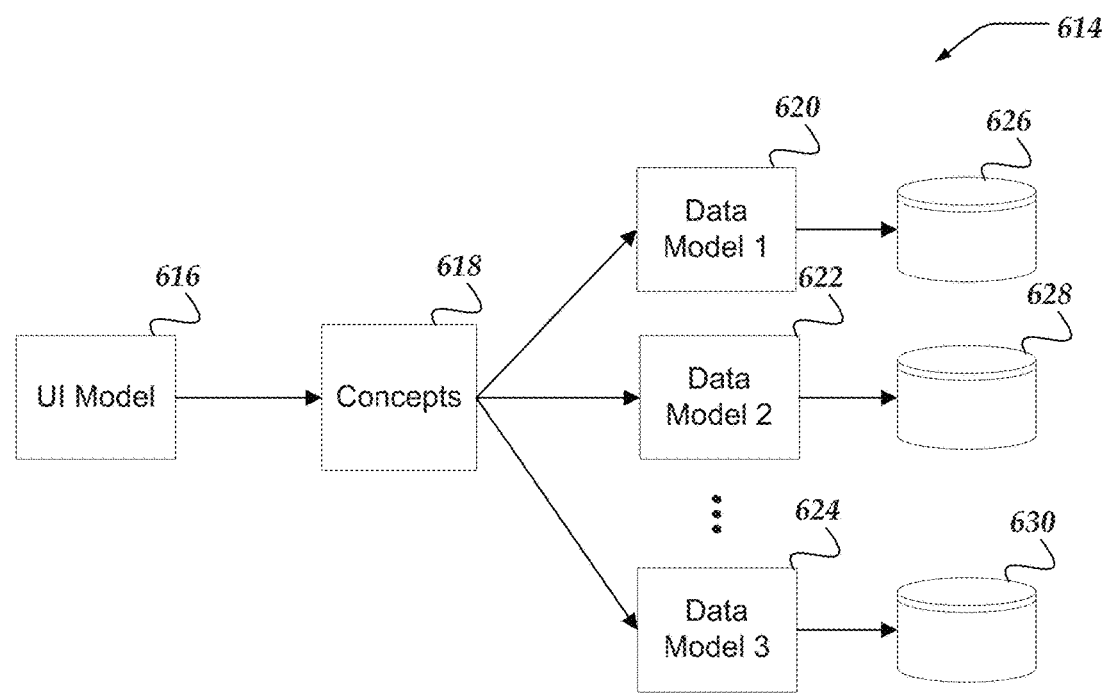
FIG. 6B illustrates a portion of a logical architecture for a system for providing user interfaces based on data source semantics in accordance with one or more of the various embodiments.

FIGS. 6A and 6B represent a portion of logical architectures for systems that may be arranged to provide user interfaces based on data source semantics in accordance with one or more of the various embodiments.

FIG. 6A illustrates a portion of a logical architecture for system 600 for providing user interfaces based on data source semantics in accordance with one or more of the various embodiments. In this figure, for brevity and clarity concept engines are omitted.

In one or more of the various embodiments, data source 602 may be associated with data model 604. Accordingly, in some embodiments, a concept engine may be arranged to map one or more of data model fields associated with data model 604 to one or more concepts, such as, concepts 606. Also, in some embodiments, concept engines may be arranged to evaluate one or more user interface models, such as, user interface model 608, user interface model 610, user interface model, or the like, to rank order them based on how closely they match concepts 606.

FIG. 6B illustrates a portion of a logical architecture for system 614 for providing user interfaces based on data source semantics in accordance with one or more of the various embodiments. In this figure, for brevity and clarity concept engines are omitted.

In some embodiments, user interface provider servers may be arranged to reverse the mapping process described for FIG. 6A. Accordingly, in one or more of the various embodiments, rather than starting with a data source or data model, the system may be provided one or more user interface models that may be mapped to one or more available data models.

In one or more of the various embodiments, one or more user interface models, such as, user interface model 616 may be provided to a concept engine (not shown here). For example, in some embodiments, concept engines may be arranged to determine concepts 618 based on the concepts that may be associated with one or more slots in user interface model 616. Accordingly, in some embodiments, concept engines may be arranged to rank order one or more available data models, such as, data model 620, data model 622, data model 624, or the like, based on how closely their data model fields map to concepts 618.

Thus, in one or more of the various embodiments, user interface engines may be enabled to generate a user interface for user interface model 616 that may be associated with one or more data sources, such as, data source 626, data source 628, data source 603, or the like, that may be determined based on a rank ordering of how close a given data source matches the concepts that may be represented by a user interface model.

Figure 7A:
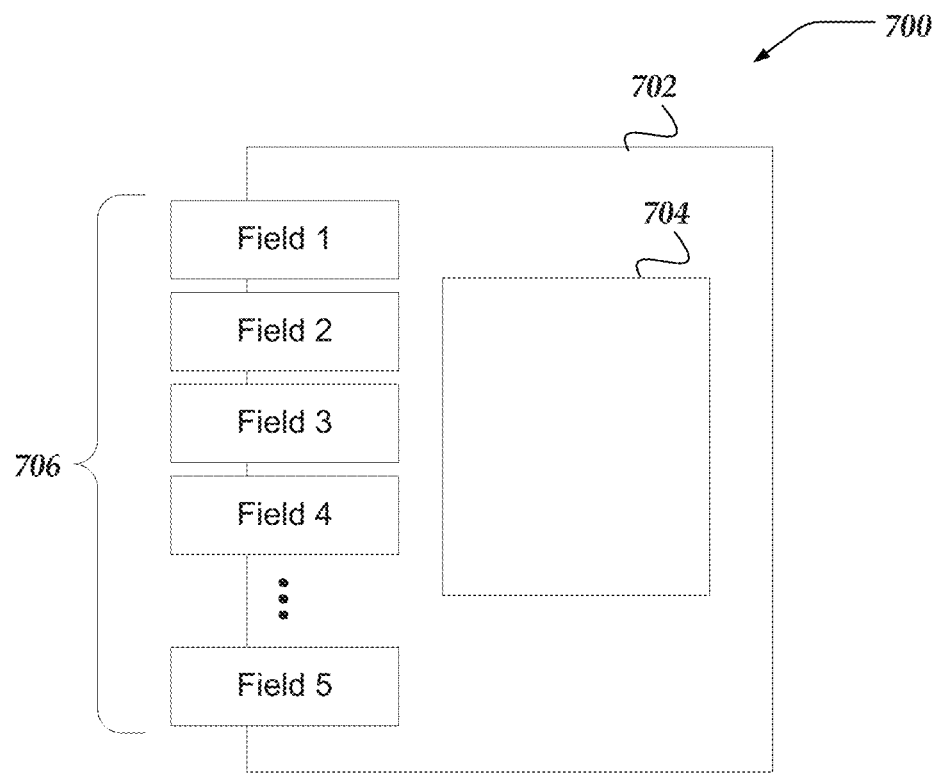
FIG. 7A illustrates a portion of a logical schematic of a data model in accordance with one or more of the various embodiments.
Figure 7B:
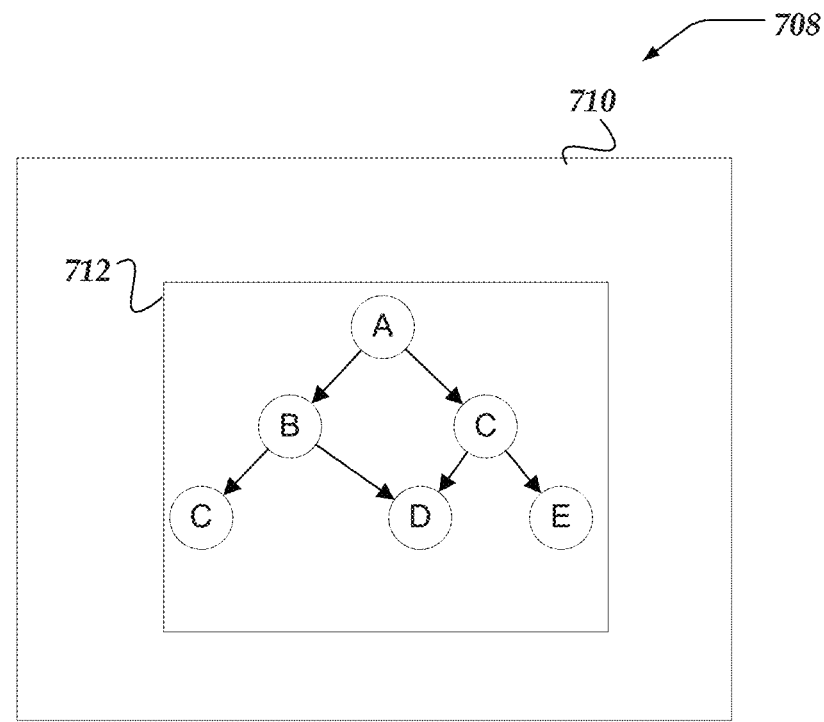
FIG. 7B illustrates a portion of a logical schematic of a data model in accordance with one or more of the various embodiments.

FIGS. 7A and 7B illustrate a logical schematic of data models in accordance with one or more of the various embodiments.

FIG. 7A illustrates a portion of a logical schematic of data model 700 that may be in accordance with one or more of the various embodiments. In one or more of the various embodiments, data model 700 may be comprised of model envelope 702, data source interface 704, fields 706, or the like. In some embodiments, data source interface 704 may be a component arranged to interface with a data source that may be associated with data model 700. For example, for some embodiments, if data model 700 is associated with a RDBMS database, data source interface 704 may represent one or more APIs for exchange queries or commands with a RDBMS, such as, ODBC, JDBC, or the like. Similarly, for example, for some embodiments, data source interface 704 may represent a REST API of a data service that provides an RDBMS-like interface. Further, in some embodiments, data source interface 704 may represent an API for access a CSV file, spreadsheet, or the like.

In one or more of the various embodiments, fields 706 represent the fields from data source interface 704 that may be exposed by data model 700. In one or more of the various embodiments, fields 706 may be some or all of the fields associated with an underlying data source. In some embodiments, the particular fields that may be exposed from data source interface 704 may be defined in configuration information, or the like.

FIG. 7B illustrates a portion of a logical schematic of data model 708 that may be in accordance with one or more of the various embodiments. In this example, model envelope 710 may include or provide data source interface, such as, data source interface 712 that exposes a graph model representing the underlying data source (not shown). In this example, the nodes of the graph model may be considered similar to data model fields, such as, that they may be mapped to concepts similar to how data model fields may be mapped to concepts.

In one or more of the various embodiments, while data model 708 may expose a graph model that represents its underlying data source, the underlying data source may or may not be a graph-based data source. For example, in some embodiments, data model 708 may be arranged to map one or more columns in one or more tables in a RDBMS database to a graph model that may be exposed to concept engines for mapping to user interface models.

Figure 8A:
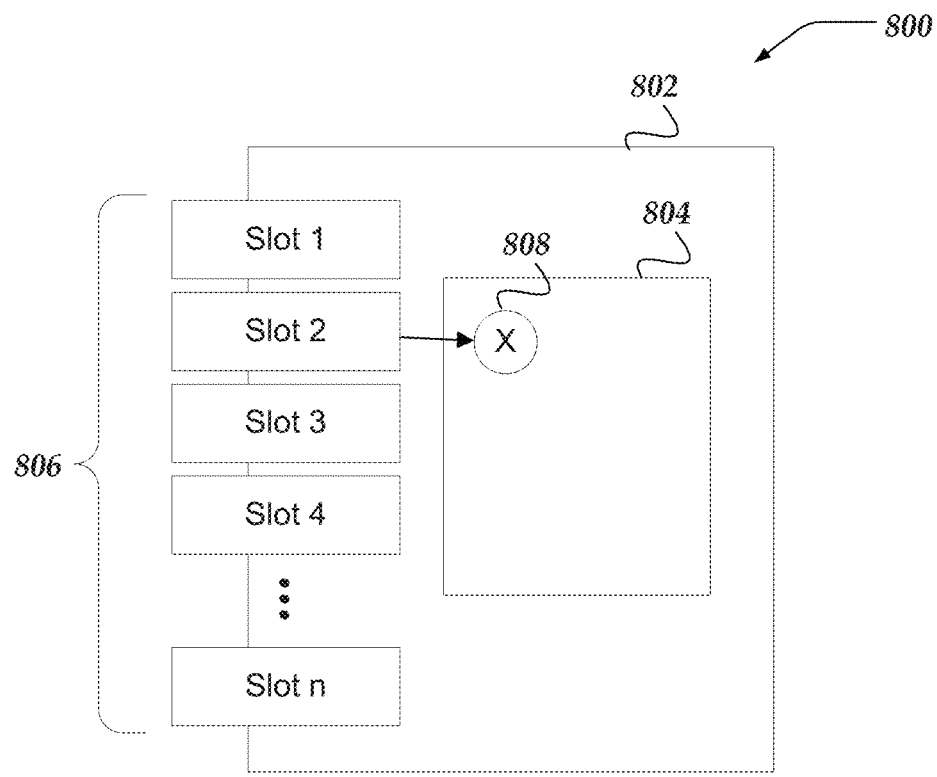
FIG. 8A illustrates a portion of a logical schematic of a user interface model in accordance with one or more of the various embodiments.
Figure 8B:
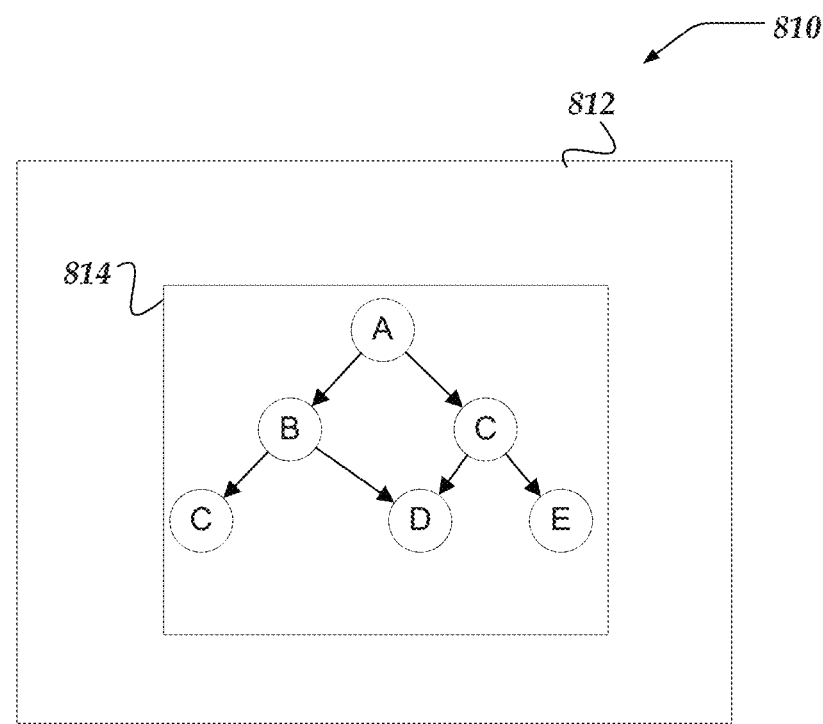
FIG. 8B illustrates a portion of a logical schematic of a user interface model in accordance with one or more of the various embodiments.

FIGS. 8A and 8B illustrate a logical schematic of user interface models in accordance with one or more of the various embodiments.

FIG. 8A illustrates a portion of a logical schematic of user interface model 800 in accordance with one or more of the various embodiments. In one or more of the various embodiments, user interface model 800 may be comprised of model envelope 802, user interface provider interface 804, concept slots 806, user interface component or visualization attribute(s) 808. or the like.

In one or more of the various embodiments, model envelopes, such as model envelope 802 may represent data structures, or the like, the contain or represent a user interface model. In some embodiments, the particular implementation of user interface model may vary depending on various design decisions, includes, the type of model, the computer languages used to define or implement a model, or the like. For example, if a user interface model is described or defined using JSON, or the like, an enclosing object may be considered a model envelope. Similarly, for example, if the user interface model is defined or described using the C programming language, the model envelope may be a combination of structs or procedures in a library or other compilation unit. Here, model envelopes are described to provide clarity by providing a logical boundary for user interface models rather than to enforce or suggest one particular implementation over another.

In some of embodiments, user interface provider interface 804 may represent one or more components that may be arranged to interface with a user interface engine, or the like, that may be associated with user interface model 800. For example, for some embodiments, if user interface model 800 is associated with a data visualization application, user interface provider interface 804 may represent one or more APIs for exchanging data or commands with a user interface engine that is arranged to render or display one or more visualizations, or the like. In some embodiments, each visualization included in user interface model may be associated with a user interface provider interface the provides the desired visualization. In some cases, visualizations and user interface provider interface are used interchangeably. For example, user interface provider interface 804 may correspond to a chart or graph visualization if rendered in a user interface.

In one or more of the various embodiments, concept slots 806 may represent the concepts that may be associated with user interface model as well as the input parameters that a user interface model may accept for generating a user interface. Accordingly, in some embodiments, concept slots correspond to concepts that a user interface model may be arranged to support. In some embodiments, concept engines or user interface engines may be arranged to bind data model fields to concept slots based on mapped concepts. For example, in some embodiments, if data model field X is mapped to concept A and concept slot 1 in a user interface model is associated with concept A, data from data model field X may be provided to a user interface via concept slot 1.

In one or more of the various embodiments, determining the concept slots for a user interface model may be determined by the designer of the user interface model or otherwise predefined. Accordingly, in some embodiments, concept engines may be arranged to determine the concepts associated with a user interface model based on the concept slots defined in the user interface model.

In one or more of the various embodiments, attribute 808 represent a visualization attribute (or user interface provider interface attribute) that may be arranged to receive data corresponding the a data model field. In one or more of the various embodiments, attributes may be associated with one or more concept slots that enable data model fields to be mapped to them. In this example, concept slot 2 is associated with visualization attribute 808.

In one or more of the various embodiments, concept engines or user interface engines may be arranged to determine the particular user interface or visualizations represented by a user interface model based on configuration information. For example, in some embodiments, one or more user interface models may be represented using various user interface design description languages that may support one or more targeted user interface engines.

In some embodiments, user interface model specifications may include information or instructions that express or define various user interface features, such as, the importance or weight of one or more concept slots, which concept slots should be visualized, what comparisons should be made, and how data should be faceted, juxtaposed, or the like. One of ordinary skill in the art can assume that user interface models need to have sufficient detail that a suitable rendering process can compose and generate an effective user interface.

In one or more of the various embodiments, the possible range of analytical objectives and desired interactions may be represented in the form of a collection of user interface models. In some embodiments, these models may be expressed using the same canonical domain concepts that data model fields may be mapped to. Accordingly, in some embodiments, user interface models may at least define the semantics and relationships required to intelligently generate an appropriate user interface.

FIG. 8B illustrates a portion of a logical schematic of user interface model 810 in accordance with one or more of the various embodiments. In this example, model envelope 812 may include or provide user interface provider interface 814 that in this example, exposes a graph model representation the underlying user interface (not shown). In this example, the nodes of the graph model may be considered similar to concept slots because they may be associated with concepts.

In one or more of the various embodiments, if a user interface model includes a graph model representation, concept engines may be arranged to evaluate or score how well a user interface model matches a data source by examining the relationships between or among user interface components in a user interface model based on the graph model.

Figure 9:
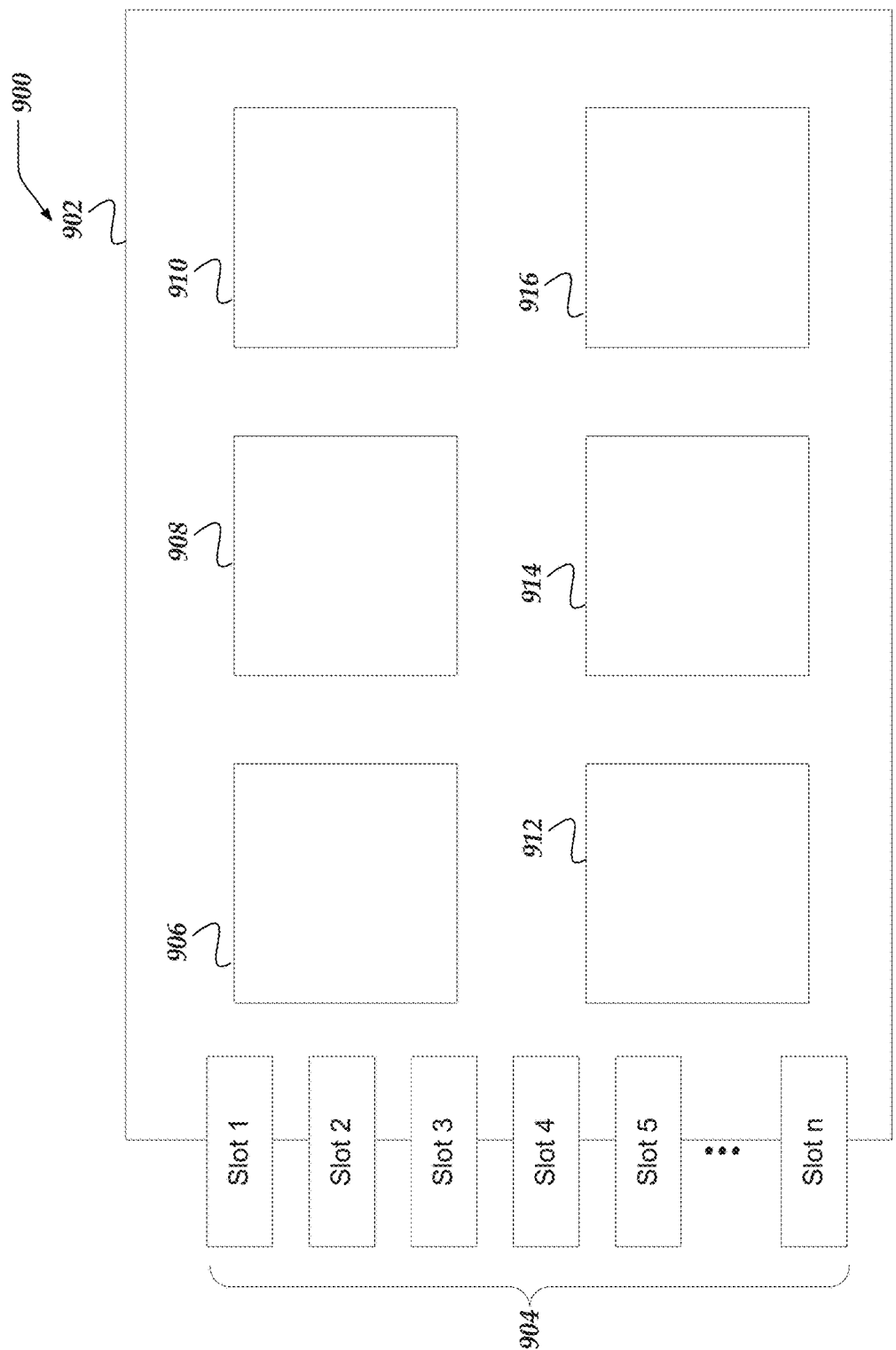
FIG. 9 illustrates a portion of a logical schematic of a user interface model that represents a dashboard model in accordance with one or more of the various embodiments.

FIG. 9 illustrates a portion of a logical schematic of user interface model 900 that represents a dashboard model in accordance with one or more of the various embodiments. In one or more of the various embodiments, user interface models may be arranged to represent dashboard user interfaces. In this example, user interface model 900 may be arranged to represent a dashboard user interface model. Accordingly, in some embodiments, user interface engines may be arranged to generate dashboard user interfaces from dashboard user interface models.

In this example, model 900 may be comprised of concept slots 904 and one or more user interface provider interfaces, such as, user interface provider interface 906-916 where each user interface provider interface may correspond to a different user interface or visualization in a dashboard. In some embodiments, the selection of the particular concept slots or user interface provider interfaces included in a dashboard model may vary depending on the purpose of a given dashboard. As described above, in some embodiments, dashboards may be designed for particular domains, such as, sales, marketing, manufacturing, executive/overview reporting, or the like.

In one or more of the various embodiments, concept engines may be arranged to evaluate how well a dashboard model matches a data model based on how the dashboard model concept slots match the concepts mapped to data model fields of the data model (e.g., data model concepts). In some embodiments, one or more concept slots of a dashboard model may be associated with concepts associated with one or more analytical objectives of a given dashboard rather than being limited to the concepts associated with its embedded user interface provider interfaces or user interface sub-models.

Figure 10:
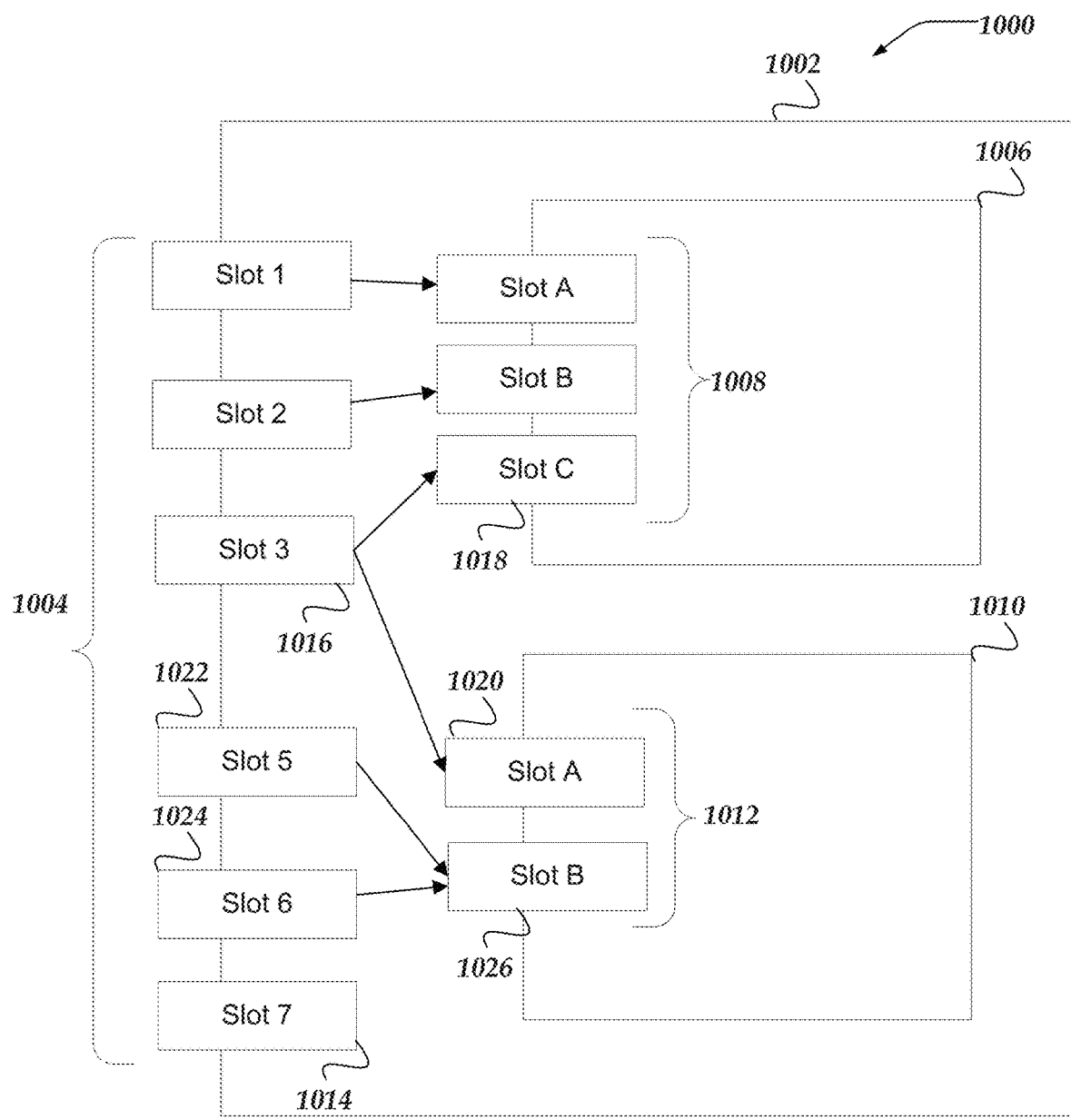
FIG. 10 illustrates a portion of a logical schematic of a user interface model that represents a compound user interface model in accordance with one or more of the various embodiments.

FIG. 10 illustrates a portion of a logical schematic of user interface model 1000 that represents a compound user interface model in accordance with one or more of the various embodiments. In one or more of the various embodiments, compound user interface models may be user interface models that may be composed of other user interface models. In this example, for some embodiments, user interface model 1000 comprises, model envelope 1002 and concept slots 1004. Also, in this example, because user interface model 1000 is a compound user interface model, it may be arranged to include additional user interface models, such as, user interface model 1006, user interface model 1008, or the like.

In one or more of the various embodiments, user interface models (sub-models) embedded or included in a compound user interface model may expose some or all of their concept slots to the enclosing compound user interface model. In turn, in some embodiments, the enclosing compound user interface model may expose some or all of the concept slots of its user interface sub-models to a concept engine. Accordingly, in some embodiments, concept engines may be arranged to evaluate how well a compound user interface model matches a data model based on the concepts associated with the data source and the concept slots of the compound model.

Also, in one or more of the various embodiments, concept engines may be arranged to evaluate how well a compound user interface model matches a data model by separately evaluating the concepts that may be associated with one or more of its sub-models.

Further, in some embodiments, compound user interface models may be arranged to provide one or more concept slots that may be independent from its sub-models. Likewise, in some embodiments, compound user interface models may be arranged to provide one or more concept slots that may be associated with two or more concept slots of its sub-models. And, in some embodiments, compound user interface models may be arranged to associate two or more concept slots with one concept slot of one or In one or more of the various embodiments, user interface models may be arranged to apply one or more rules, functions, transforms, or the like, to one or more concept slots, including concept slots of sub-models.

In this example, for some embodiments, concept slot 1014 may represent a concept slot of compound user interface model 1000 that may be considered separate or independent of the sub-models. Also, in this example, concept slot 1018 and concept slot 1020 may represent two concepts associated with different sub-models that may be exposed as a single concept by concept slot 1016. For example, in some embodiments, concept slot 1018 or user interface sub-model 1006 and concept slot 1020 of user interface sub-model may represent the same concept, such as, units-sold, or the like. Accordingly, in this example, concept slot 1016 may also be associated with the units-sold concept. Alternatively, for example, for some embodiments, concept slot 1016 may represent a concept that represents a combination of two different concepts from two different sub-models rather than representing a same concept in two or more sub-models. For example, in some embodiments, concept slot 1016 may represent the concept total-sales that may be a sum of concept slot 1018 and concept slot 1020.

Also, in this example, for some embodiments, concept slot 1022 and concept slot 1024 may represent two concept slots exposed by a compound user interface model that may be associated with the same concept slot, such as, concept slot 1014. For example, for some embodiments, concept slot 1022 may represent the concept street-address, concept slot 1024 may represent the concept city-state, or the like, while concept slot 1026 may represent the concept home-address. Accordingly, in this example, user interface model 1000 may be arranged to execute one or more rules or procedures to split the concept address represented by concept slot 1026 into separate concepts that may be represented by concept slot 1022, concept slot 1024, or the like.

Note, for brevity and clarity user interface provider interface attributes or visualization attributes have been omitted here. One of ordinary skill in the art will appreciate that the concept slots of sub-models may be associated with one or more attributes of the user interface provider interfaces or visualizations in each user interface model or user interface sub-model.

Figure 11:
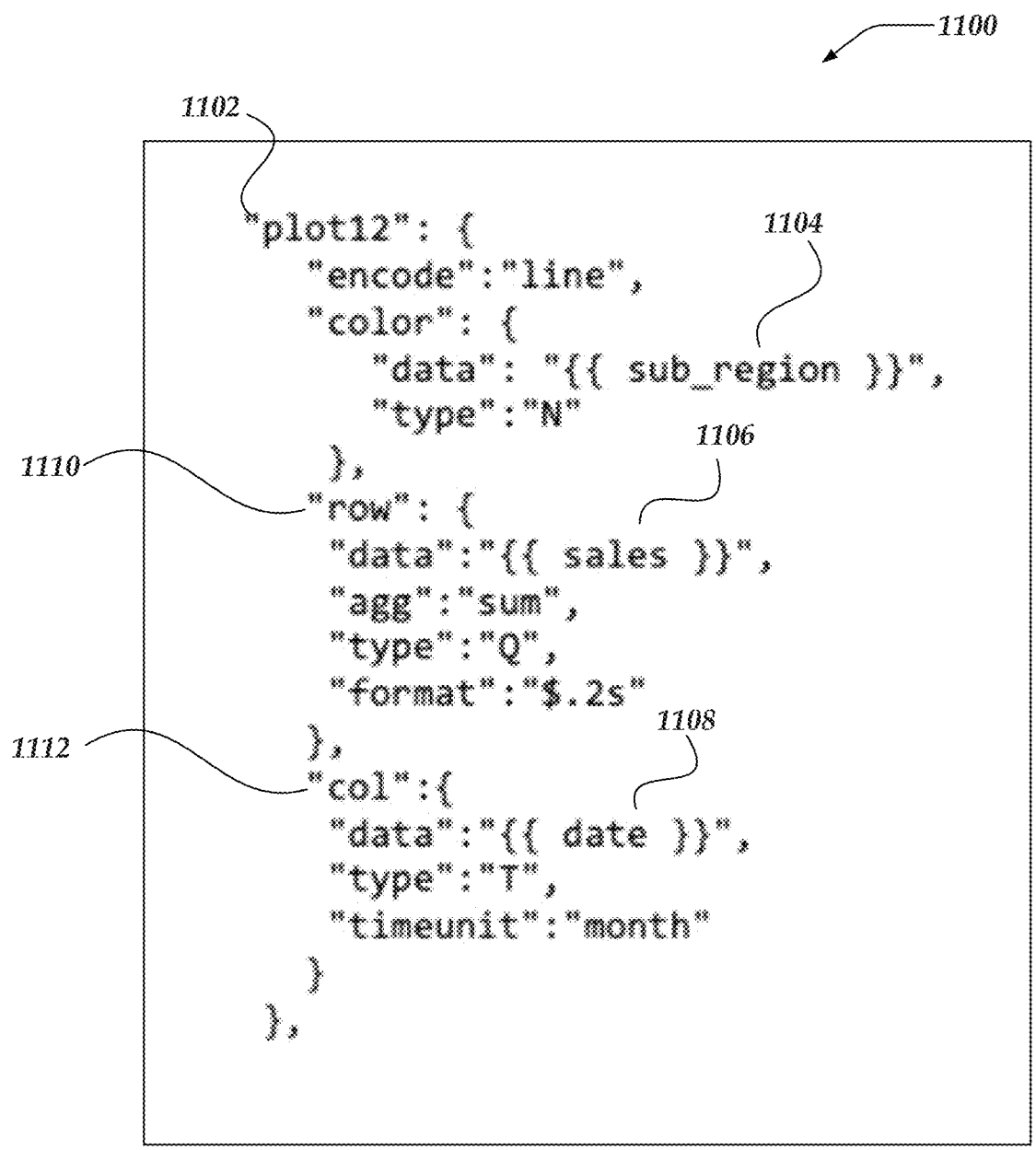
FIG. 11 illustrates a representation of a portion of a user interface model described using JSON in accordance with one or more of the various embodiments.

FIG. 11 illustrates a representation of a portion of user interface model 1100 described using JSON in accordance with one or more of the various embodiments. As described above, user interface models may be implemented or represented using various data structures, user interface description languages, data formats, or the like. In this example, user interface model 1100 is represented using JSON. Accordingly, in this example, model envelope 1102 defines an enclosing object definition for user interface model 1100. Further, in this example, concept slot 1104 represents a concept slot that may be associated with a concept named subregion. Likewise, in this example, concept slot 1106 represents a concept slot that may be associated with a concept named sales; and concept slot 1108 may represent a concept named date.

Also, in this example, user interface model 1100 illustrates how concept slots may be associated with meaningful attributes associated with a user interface provider interface or visualization. In this example, attribute 1110 corresponds to a row value of a visualization and attribute 1112 may correspond to a column value of the same visualization. Thus, in this example, the illustrated portion of user interface model 1100 represents a user interface model that defines a visualization that at least plots sales information against date information.

FIG. 12 illustrates a logical schematic of a portion of concept engine 1200 for mapping data model fields to concepts in accordance with one or more of the various embodiments. As described above, concept engines may be arranged to map data model fields to concepts. Accordingly, in some embodiments, concept engines may be arranged to employ one or more objects, such as, concept mapping object 1202, concept mapping object 1214, or the like, to facilitate mapping actions. In some embodiments, a concept mapping object may be a collection of concepts and rules for mapping data model fields to concepts.

In some embodiments, concept mapping objects, such as, concept mapping object 1202 may be arranged to store or reference concepts, such as concepts 1204. Accordingly, in some embodiments, concepts 1204 may be associated with one or more map rules, such as, map rules 1206. Further, in some embodiments, concept mapping objects may be arranged to include other information, such as, data type 1208, or the like. Also, in some embodiments, concept mapping objects may include one or more may be associated with additional information, or meta-data represented by column 1210 that may include various properties associated with concepts or concept values, such as, expected cardinality (for categorical values), distribution and range (for quantitative values), one or more scagnostic measures (e.g., skew, or the like), or the like.

In one or more of the various embodiments, one or more concept identifiers or references to concepts for a domain may be stored in concept 1204. In this example, concept mapping object 1202 may be directed to the customer sales domain. Accordingly, in this example, concepts 1204 may include various concepts that may be associated with customer sales.

In one or more of the various embodiments, mapping rules 1206 may store or reference various rules, instructions, processes, systems, or the like, or combination thereof, that may be executed by a concept engine to determine if (or how well) a data model field maps to a given concept. In this example, if a data model field conforms to the map rules in row 1212, that data model field may be associated with the sales concept.

In one or more of the various embodiments, as described above, concepts may be grouped by domains. Accordingly, in this example, concept mapping object 1214 represents a concept mapping object that may be arranged for concepts in a different domain that concept mapping object 1202. For example, for some embodiments, concept mapping object 1202 may be associated with the domain of customer sales information while concept mapping object 1214 may be associated with the domain of product sales information.

In one or more of the various embodiments, concept engines may be arranged to employ concept mapping objects to map data model fields of a data model to concepts. In some embodiments, this mapping may provide a collection of tuples such as domain map 1216. Accordingly, concept engines may be arranged to employ domain maps to identify concept-field association for a data model. Herein, the data model concept may be used to help distinguish between concepts generally and those that have been mapped to data model fields.

In one or more of the various embodiments, other combinations of data objects may be used to provide similar features for mapping data model fields to concepts. For example, one or more of concept mapping object 1202, concept mapping object 1214, domain map 1216, or the like, may be combined with another data object, separated into multiple data objects, replaced with one or more alternative data objects, or omitted (e.g., by employing inherent or implicit properties, associations, characteristics, or the like). Also, for clarity and brevity, concept mapping object 1202, concept mapping object 1214, and domain map 1216 are represented here using a tabular format. In some embodiments, data objects may be arranged differently, such as using different formats, data structures, objects, or the like.

FIG. 13 illustrates a portion of a logical description of mapping process 1300 for mapping data model fields to concepts in accordance with one or more of the various embodiments.

As described above, in some embodiments, concept engines may be arranged to map data model fields to domain concepts. In this example, a concept engine may be arranged to generate domain maps by mapping data model field names to putative concepts.

In one or more of the various embodiments, concept engines may be arranged to various mapping strategies in the form of mapping rules. In some embodiments, a particular mapping strategy may be determined based on configuration information. For example, in some embodiments, different mapping methods may be associated with different domains, data models, or the like. Accordingly, concept engines may be arranged to employ configuration information to determine a particular mapping method.

In this example, at line 1, a collection of data model fields may be provided. At line 2, a collection of domain vocabularies may be provided. Here, each domain vocabularies may be considered to include one or more domain concepts. At line 3, a container for domain mappings is defined. At line 4, the concept engine may begin iterating over each concept in each domain vocabulary. At line 6, the concept engine may iterate over each field in a data model fields collection. As the nested iterations continue, the concept engine may employ one or more mapping rules to determine if a given field maps to a given concept. The particular mapping rule employed by a concept engine may vary depending on configuration information.

Accordingly, in this example, at the conclusion of mapping process 1300, for a single data model, there may be a number of possible domain mappings. It is not required that all fields or all concepts have a mapped pair. Further, in some embodiments, mapping rules may be arranged such that a concept may map to more than one field if it satisfies the mapping criteria.

Note, the example of process 1300 is expressed in pseudo-code that further clarifies one or more features of at least one of the various embodiments. These embodiments may be implemented using functions, methods, data structures, variable names, control structures, or the like, other than those shown below. In some embodiments, programming styles may be different than the examples shown below. For example, one of ordinary skill in the art will appreciate that the innovations disclosed herein may be implemented using various programming styles, such as, functional programming, imperative programming, object-oriented programming, or the like, or combination thereof. Further, one of ordinary skill in the art will appreciate that one or more embodiments may be implemented using various computer programming languages, such as, Python, Perl, C, C++, C#. Java, JavaScript, Haskell, Closure, custom languages, or the like, or combination thereof. Further, in some embodiments, some or all of the actions performed by process 1300 may be performed using embedded logic hardware devices, such as, Application Specific Integrated Circuits (A Sics), Field Programmable Gate Arrays (FPGA), Programmable Array Logic systems (PAL), or the like.

FIG. 14 illustrates a portion of logical description of ranking process 1400 for ranking user interface models based on how well they match a data source in accordance with one or more of the various embodiments.

As described above, in some embodiments, concept engines may be arranged to match data model domain maps to user interface models. Accordingly, given a data model domain map and set of user interface models, concept engines may be arranged to compare the domain concepts common to the data model and user interface model. pair.

In this example, for some embodiments, concept engines compare data models to user interface models based on three different attributes, i, j, and n. In this example, i may be considered the cardinality of the intersection of unique concepts between data model domain mappings and user interface models (e.g., the number of terms that may be in common). In this example, i represents the number of data model fields that the user interface model can represent and can be used as a measure of the coverage of both the domain and data model. In this example, j may be the Jaccard Index, a normalized measure of the intersection between a domain mapping and a user interface model. This may be the cardinality of the intersection divided by the cardinality of the union and is a well-known technique for measuring similarity between sets of keywords. Here, in this example, a value of 1 represents complete overlap and a value of 0 is disjoint. This provides an indication of how well the domain and model overlap. In this example, n may be the number of user interface components in a user interface model that can be satisfied given a specific domain mapping. In this example, to determine satisfiability, the concept engine may analyze each various portions of user interface model (e.g., sub-models) in a user interface model and make sure that the paired domain map includes all the concepts necessary for a user interface engine to generate a usable/useful user interface from the mapping. In this example, concept engines may generate these mapping for each data model domain map/user interface model pair and then rank the resulting list of pairs. In this example, i may be considered the primary sort key followed by secondary sorts on j and n respectively.

Note, the example of process 1400 is expressed in pseudo-code that further clarifies one or more features of at least one of the various embodiments. These embodiments may be implemented using functions, methods, data structures, variable names, control structures, or the like, other than those shown below. In some embodiments, programming styles may be different than the examples shown below. For example, one of ordinary skill in the art will appreciate that the innovations disclosed herein may be implemented using various programming styles, such as, functional programming, imperative programming, object-oriented programming, or the like, or combination thereof. Further, one of ordinary skill in the art will appreciate that one or more embodiments may be implemented using various computer programming languages, such as, Python, Perl, C, C++, C#. Java, JavaScript, Haskell, Clojure, custom languages, or the like, or combination thereof. Further, in some embodiments, some or all of the actions performed by process 1400 may be performed using embedded logic hardware devices, such as, Application Specific Integrated Circuits (ASICs), Field Programmable Gate Arrays (FPGAs), Programmable Array Logic systems (PAL), or the like.

Figure 15:
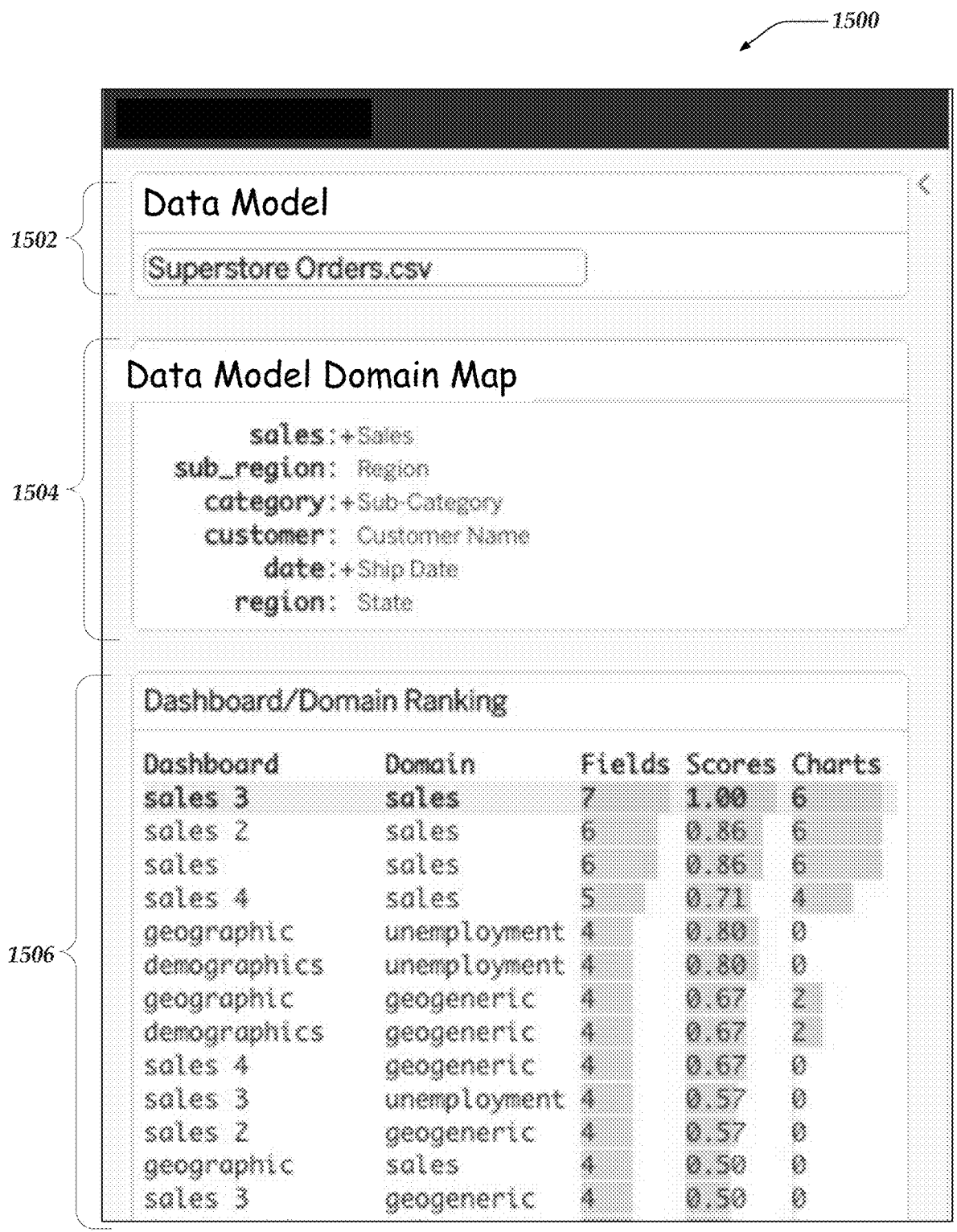
FIG. 15 illustrates a portion of an information panel for displaying information related to ranking dashboard models based on how well they map to data models in accordance with one or more of the various embodiments.

FIG. 15 illustrates a portion of information panel 1500 for displaying information related to ranking dashboard models or other user interface models based on how well they map to data models in accordance with one or more of the various embodiments.

In this example, information panel 1500 shows the data model (panel portion 1502), the current domain concept map being applied to the data model (panel portion 1504), and the scoring and ranking for all dashboard models with respect to how well they match the data model, sorted by rank. By default, the highest scoring pair is selected, but may be overridden by the user.

Figure 16:
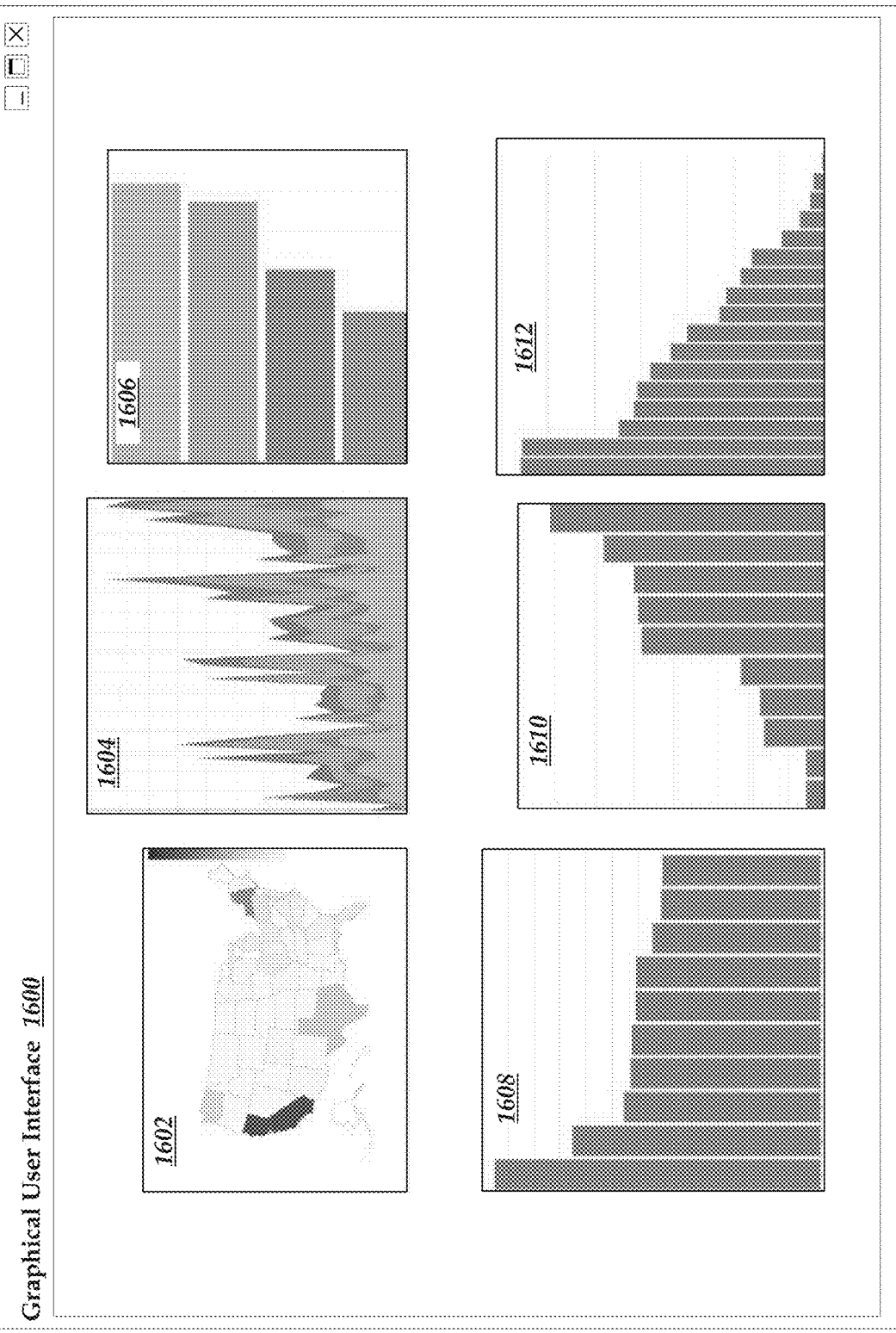
FIG. 16 illustrates a portion of a user interface that may be generate based on a dashboard model in accordance with one or more of the various embodiments.

FIG. 16 illustrates a portion of user interface 1600 that may be generate based on a dashboard model in accordance with one or more of the various embodiments. In this example, user interface 1600 may be considered a dashboard user interface generated by a user interface engine based on a dashboard model and information provided by data source via a data model. In this example, user interface 1600 may include several visualizations, such as, visualization 1602-1612 that may be associated with one or more KPIs, or the like, for an organization.

Figure 17:
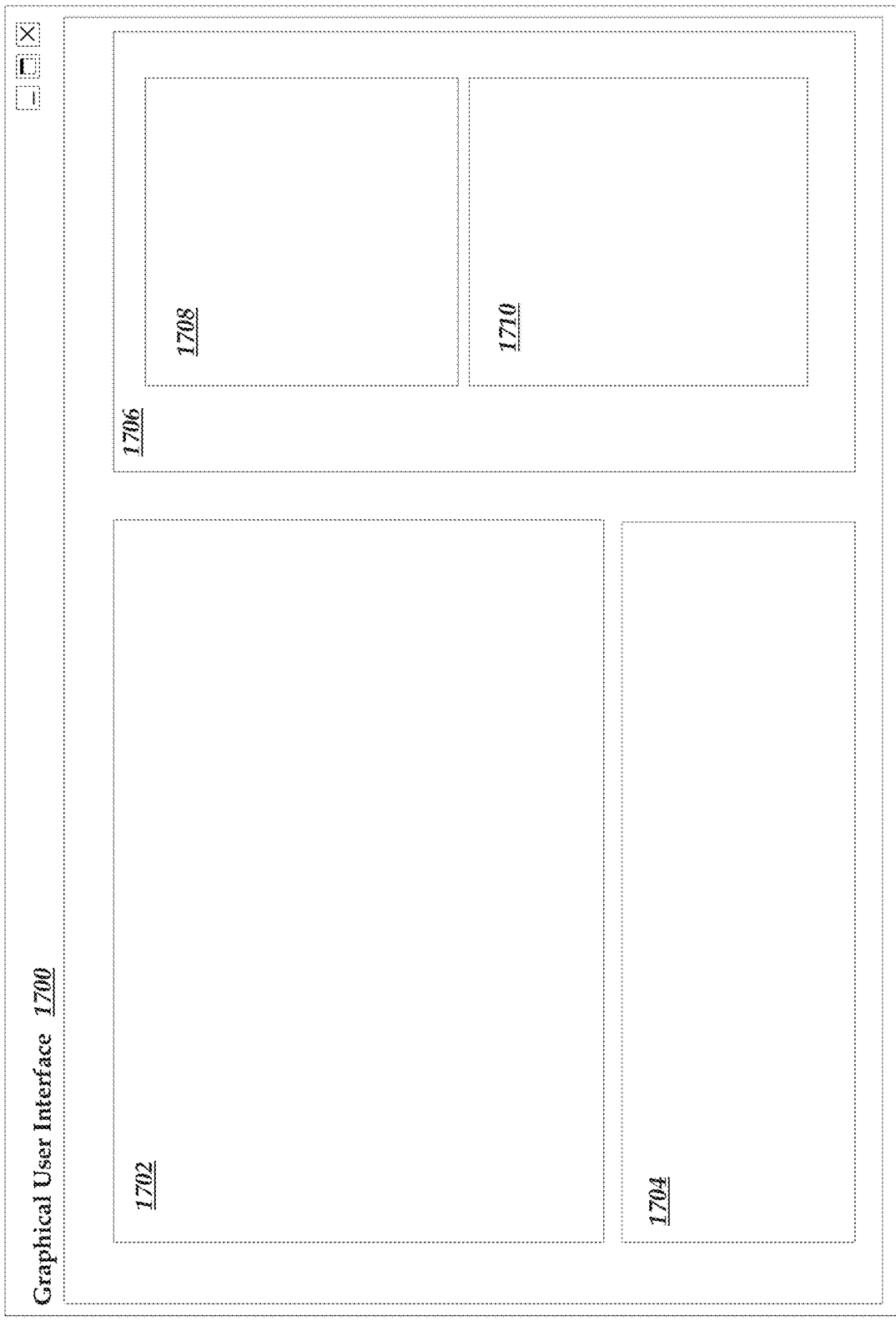
FIG. 17 illustrates a portion of a user interface that displays user interface components based on how corresponding user interface sub-models are ranked in a compound user interface model in accordance with one or more of the various embodiments.

FIG. 17 illustrates a portion of user interface 1700 that displays user interface components based on how corresponding user interface sub-models are ranked in a compound user interface model in accordance with one or more of the various embodiments.

In some embodiments, user interface models may include two or more sub-user interface models. Or, in some embodiments, a user interface model may be comprised of more than one user interface provider interfaces (or visualizations). In either case, the different sub-parts of a user interface model may be styled or positioned based on rules or conditions that may determine how individual sub-parts of user interface model may be rendered in a user interface.

In some embodiments, concept engines may be arranged to evaluate each sub-part to generate layout or styling information that may be employed by a user interface engine if it generates a user interface, such as, user interface 1700. For example, user interface 1700 may be generated based on a compound user interface model that includes several user interface sub-models. Accordingly, in this example, the sub-model that scores the highest (for some criteria) may be assigned sub-part 1702 because it is the highest ranked sub-models in its parent compound user interface model.

In one or more of the various embodiments, the particular layout or styling rules or how they are evaluated may vary depending on the particular compound user interface model or dashboard model. For example, rules may be provided that group two or more sub-parts based on given criteria. In this example, sub-part 1708 and sub-part 1710 may be placed in group 1706 because they may be associated with the same concepts.

Similarly, for example, a user interface model (e.g., compound user interface model or dashboard model) may be arranged to define or describe more sub-models or sub-parts than can be displayed at the same time. Accordingly, in some embodiments, the lowest scoring sub-models or sub-parts may be excluded from be displayed if the user interface model is generated by a user interface engine.

Accordingly, in one or more of the various embodiments, concept engines may be arranged to execute one or more rules for determining layout or styling for the sub-parts of a user interface provided via configuration information.

Generalized Operations

FIGS. 18-26 represent generalized operations for providing user interfaces based on data source semantics in accordance with one or more of the various embodiments. In one or more of the various embodiments, processes 1800, 1900, 2000, 2100, 2200, 2300, 2400, 2500, and 2600 described in conjunction with FIGS. 18-26 may be implemented by or executed by one or more processors on a single network computer (or network monitoring computer), such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 18-26 may be used for providing user interfaces based on data source semantics in accordance with at least one of the various embodiments or architectures such as those described in conjunction with FIGS. 4-17. Further, in one or more of the various embodiments, some or all of the actions performed by processes 1800, 1900, 2000, 2100, 2200, 2300, 2400, 2500, and 2600 may be executed in part by concept engine 322, user interface engine 324, data sources 326 one or more processors of one or more network computers.

Figure 18:
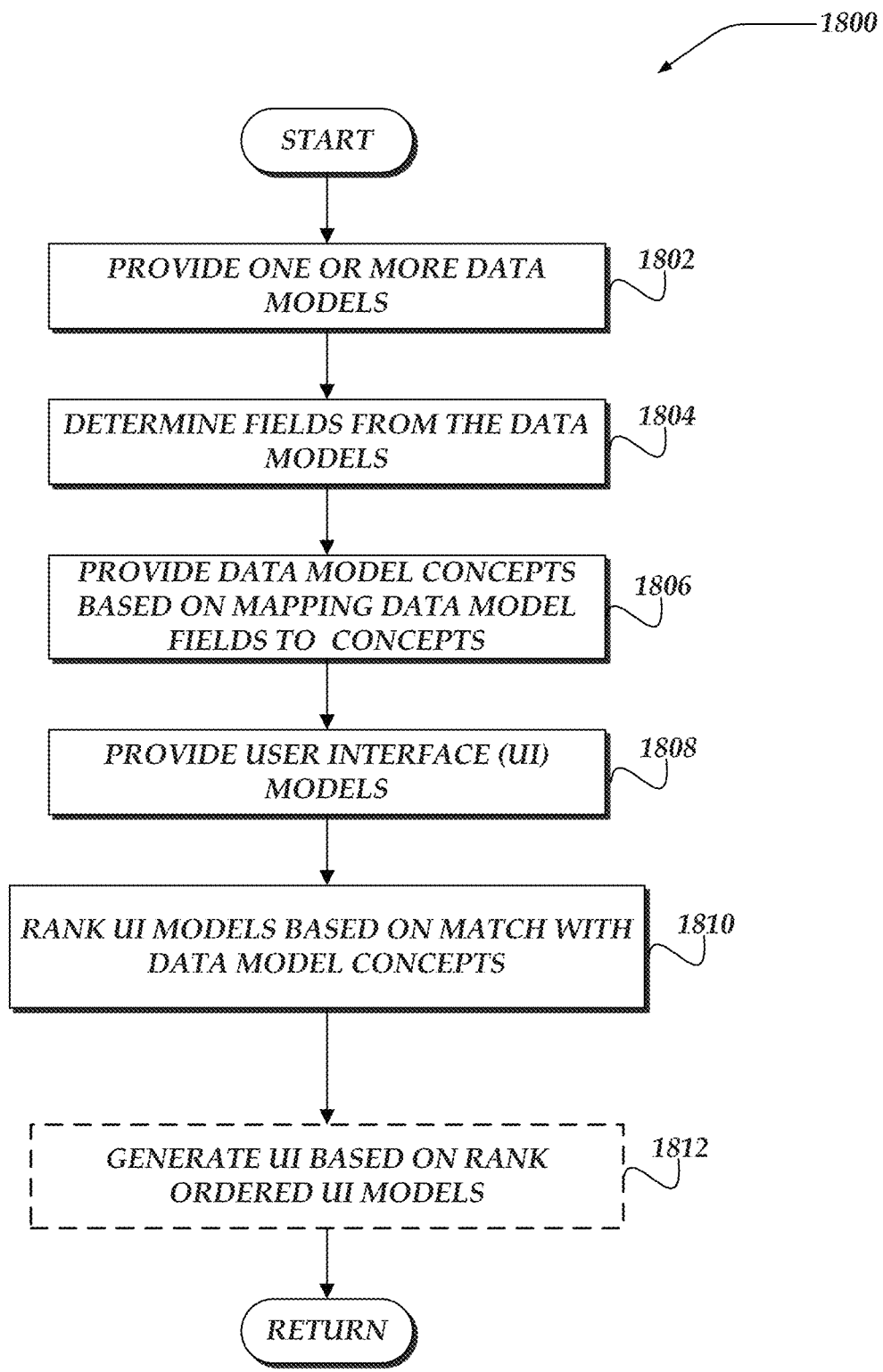
FIG. 18 illustrates an overview flowchart for a process for providing user interfaces based on data source semantics in accordance with one or more of the various embodiments.

FIG. 18 illustrates an overview flowchart for process 1800 for providing user interfaces based on data source semantics in accordance with one or more of the various embodiments. After a start block, at block 1802, in one or more of the various embodiments, one or more data models may be provided to a concept engine. As described above, data models may be based on or associated with data sources that provide the data that may be used in user interfaces, dashboards, or visualizations. In one or more of the various embodiments, data models may be inherently determinable from a data source (e.g., discoverable schemas) or they may be provided by data models providers or other services.

At block 1804, in one or more of the various embodiments, the concept engine may be arranged to determine one of more data model fields based on the one or more data models. As described above, data models include one or more fields that may be determined from the data model. For example, in some embodiments, data model fields may be column names of tables. In other embodiments, data model fields may be determined from node names, node labels, or the like, for data models that may be based on graphs.

At block 1806, in one or more of the various embodiments, the concept engine may be arranged to provide one or more data model concepts based on mapping the data model fields to concepts. In one or more of the various embodiments, concept engines may be arranged to execute one or more rules to map concepts to data model fields. As described above, the particular mapping rules may be selected based on various factors, including, domain(s) of interest, organizational/user preferences, targeted user interface engine, available user interface models, targeted applications, or the like. Accordingly, in some embodiments, concept engines may be arranged to determine some or all of the mapping rules or mapping procedures based on configuration information.

At block 1808, in one or more of the various embodiments, one or more user interface models may be provided to the concept engine. In some embodiments, concept engines may be arranged to have access to a store of user interface models that have been associated with one or more domains or domain concepts. In one or more of the various embodiments, these user interface models may be provided or generated by other services or applications and made available to concept engines.

At block 1810, in one or more of the various embodiments, the concept engine may be arranged to rank the one or more user interface models based on match scores that may be generated based on one or more comparisons of the data model concepts and the concepts associated with the one or more user interface models. In one or more of the various embodiments, concept engines may be arranged to execute one or more rules to generate one or more match scores for matching user interface models to data models based on concepts. As described above, the particular matching rules may be selected based on various factors, including, domain(s) of interest, organizational/user preferences, targeted user interface engine, available user interface models, targeted applications, or the like. Accordingly, in some embodiments, concept engines may be arranged to determine some or all of the matching rules, scoring procedures, or ranking criteria based on configuration information.

At block 1812, in one or more of the various embodiments, optionally, a user interface engine may be arranged to generate a user interface based on the rank ordered user interface models. In some embodiments, a user interface provider system may be arranged to automatically generate a user interface based on the top ranked user interface models rather than being limited to producing a panel or report that includes the rank ordered list of user interface models.

Next, in one or more of the various embodiments, control may be returned to a calling process.

Figure 19:
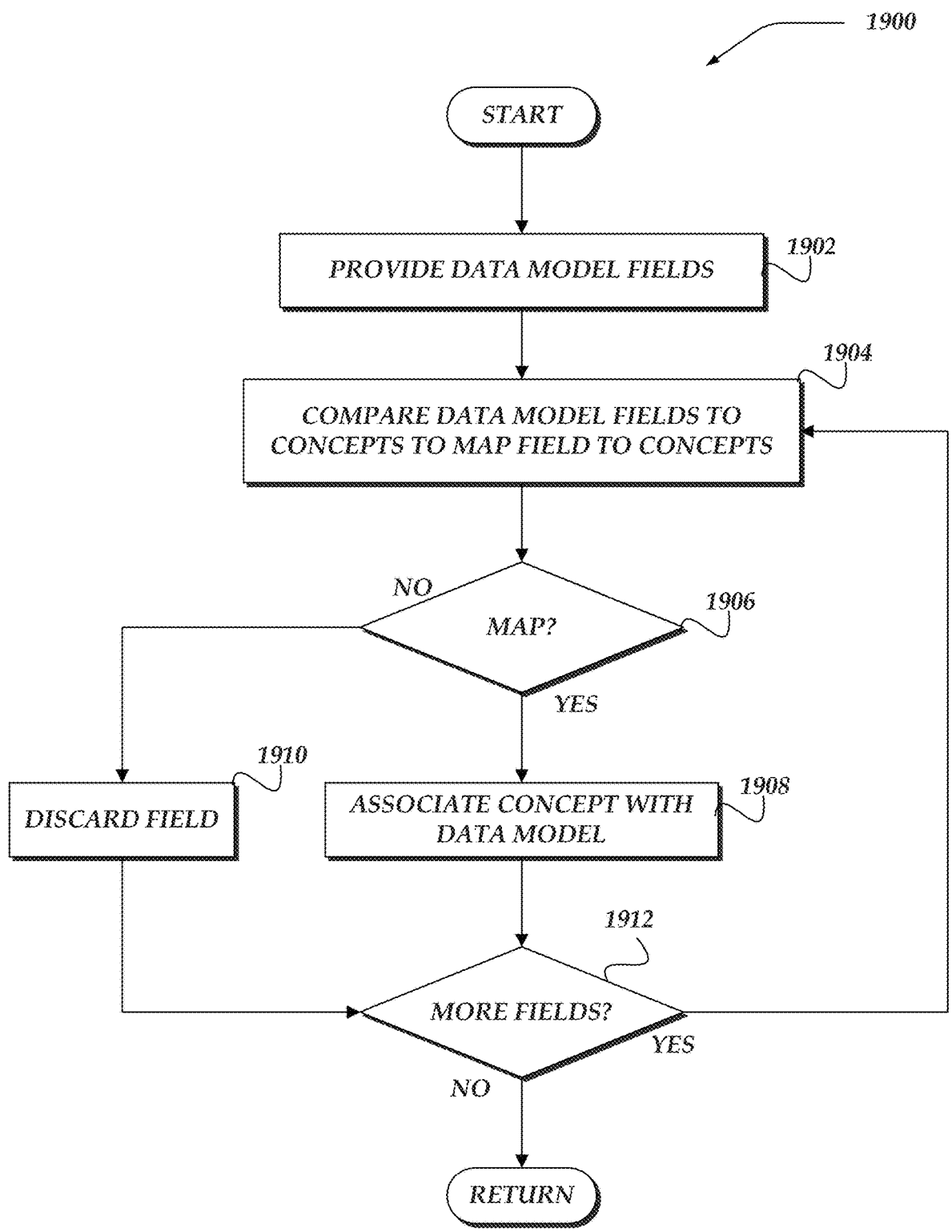
FIG. 19 illustrates a flowchart for a process for associating concepts with data model fields in accordance with one or more of the various embodiments.

FIG. 19 illustrates a flowchart for process 1900 for associating concepts with data model fields in accordance with one or more of the various embodiments. After a start block, at block 1902, in one or more of the various embodiments, one or more data model fields may be provided to a concept engine. As described, data models may be associated with one or more data model fields. In some embodiments, concept engines may be arranged to determine the one or more data model fields from an associated data model.

At block 1904, in one or more of the various embodiments, the concept engine may be arranged to compare the one or more data model fields to one or more concepts to map fields to concepts. In one or more of the various embodiments, concept engines may be arranged to perform various actions including, pattern matching, or the like, to determine which domain concept, if any, to map a data model field.

At decision block 1906, in one or more of the various embodiments, if the field maps to a concept, control may flow to block 1908; otherwise, control may flow to block 1910.

At block 1908, in one or more of the various embodiments, the concept engine may be arranged to associate the concept with the data model. In some embodiments, concept engines may be arranged to generate a domain map for storing the association of data model fields to concepts.

At block 1910, in one or more of the various embodiments, the concept engine may be arranged to discard the data model field because it failed to map to a concept.

At decision block 1912, in one or more of the various embodiments, if there may be more data model fields for the concept engine to evaluate, control may loop back to block 1904; otherwise, control may be returned to a calling process.

Next, in one or more of the various embodiments, control may be returned to a calling process.

Figure 20:
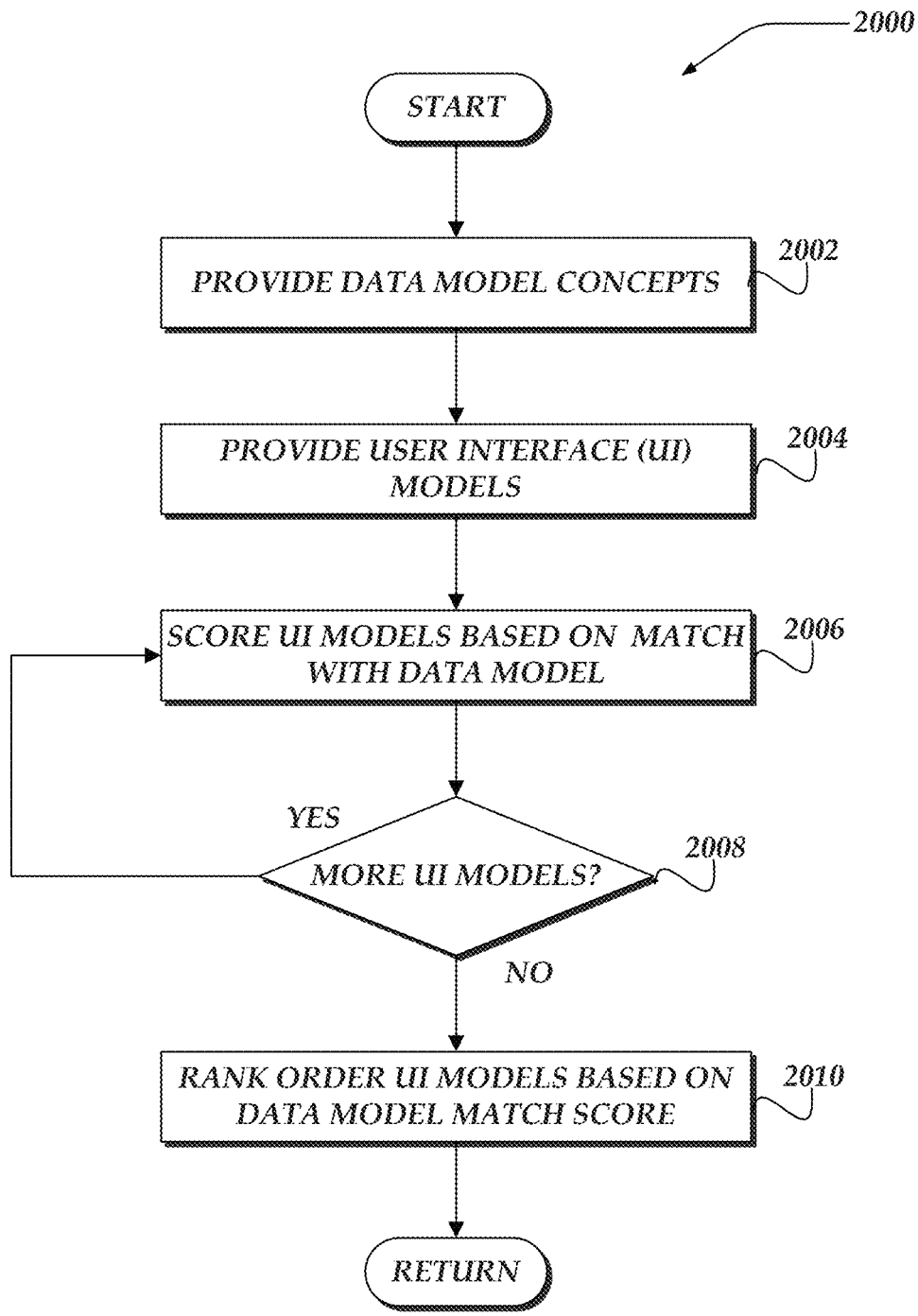
FIG. 20 illustrates a flowchart for a process for scoring and ranking user interface models based on how well they match a data model in accordance with one or more of the various embodiments.

FIG. 20 illustrates a flowchart for process 2000 for scoring and ranking user interface models based on how well they match a data model in accordance with one or more of the various embodiments. After a start block, at block 2002, in one or more of the various embodiments, one or more data model concepts may be provided to a concept engine. As described above, in some embodiments, concept engines may be arranged to map data model fields to concepts, here these may be described as data model concepts or data model domain concepts. Alternatively, a collection of fields mapped to concepts may be referred to a domain mapping or domain map.

At block 2004, in one or more of the various embodiments, one or more user interface models may be provided to the concept engine. In one or more of the various embodiments, concept engines may be provided access to a store of user interface models. The particular user interface models may be determined based on which user interface models a user, organization, or the like, may have access to. In some embodiments, users or organizations may generate their own user interface models. In other embodiments, users or organizations may have access to other sources of user interface models, such as, shared repositories, marketplaces, or the like.

At block 2006, in one or more of the various embodiments, the concept engine may be arranged to score the user interface models based on how well they match the data model. In one or more of the various embodiments, concept engines may execute various match rules or match processes to score how well a user interface models matches a data model. In some embodiments, concept engines may be arranged to obtain the criteria for scoring matches or the rules or processes for determining match scores from configuration information.

At decision block 2008, in one or more of the various embodiments, if there are more user interface models to score, control may loop back to block 2006; otherwise, control may flow to block 2010.

At block 2010, in one or more of the various embodiments, the concept engine may be arranged to rank order the user interface models according to how well they matched data model or otherwise based on a provided match score.

Next, in one or more of the various embodiments, control may be returned to a calling process.

Figure 21:
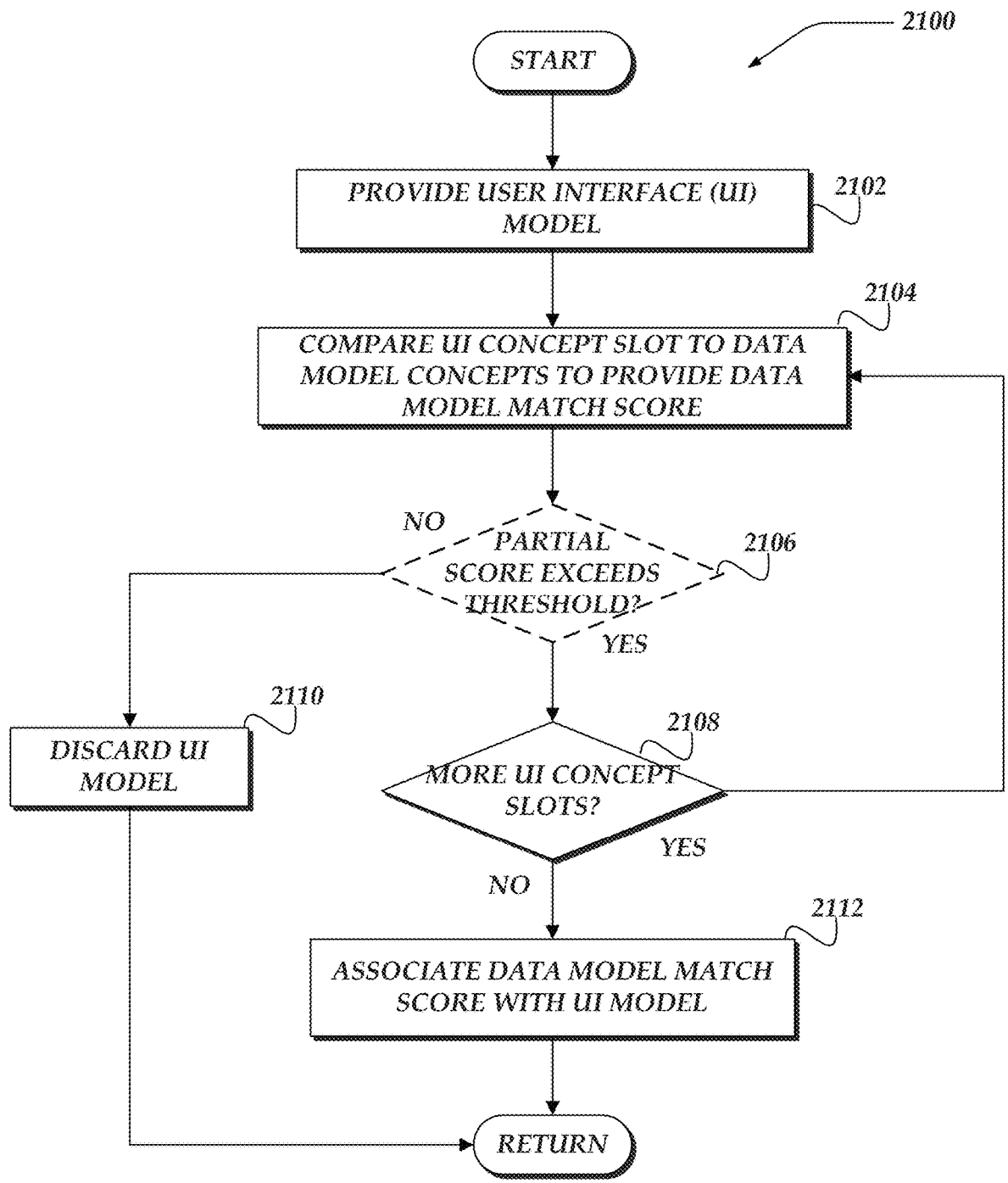
FIG. 21 illustrates a flowchart for a process for scoring user interface models based on concept matching in accordance with one or more of the various embodiments.

FIG. 21 illustrates a flowchart for process 2100 for scoring user interface models based on concept matching in accordance with one or more of the various embodiments. After a start block, at block 2102, in one or more of the various embodiments, a user interface model may be provided to a concept engine.

At block 2104, in one or more of the various embodiments, the concept engine may be arranged to compare user interface concepts that may be associated with the user interface model to one or more data model concepts to provide a match score. As described above, user interface models may include one or more concept slots that each are associated with a concept. Thus, in some embodiments, user interface models may be compared to data models by comparing the data model concepts with the concept slots of the user interface model. In one or more of the various embodiments, a match of a data model concept with a user interface model concept slot indicates that a data model fields corresponding to the data model concept may be associated with the concept slot of the data model. In one or more of the various embodiments, concept engines may be arranged to determine the rules or criteria for providing a match score based on configuration information.

In one or more of the various embodiments, concept engines may be arranged to progressively produce match scores as more concept comparisons are performed. For example, in some embodiments, scoring rules may be arranged such that each concept match adds 0.1 to a partial match score.

At decision block 2106, in one or more of the various embodiments, optionally, if a partial score for a user interface model exceeds a defined threshold value, control may flow to decision block 2108; otherwise, control may flow to block 2110. In one or more of the various embodiments, concept engines may be arranged to progressively evaluate a user interface model match score as concept slots are matched or mismatched. Accordingly, in some embodiments, concept engines may be arranged to evaluate this score progression as it occurs. Accordingly, in some embodiments, the performance of concept engines may be improved by terminating the evaluation of a poorly performing user interface model before all of its concept slots have been evaluated.

For example, in one or more of the various embodiments, concept engines may be arranged to track the total number of concept slots in a user interface model and the number of matches and mismatches. Thus, for example, a concept engine may be arranged to employ a score rule that abandons a user interface model as soon as its potential highest match score drops below a defined threshold value.

Likewise, for example, concept engines may be arranged to employ a score rule that abandons a user interface model if it may determine that final score for the user interface model will result in the user interface model being ranked below a defined threshold.

In one or more of the various embodiments, concept engines may be arranged to determine the rules or criteria for abandoning a user interface model based on configuration information.

Note, this decision block is indicated as optional because, in some embodiments, concept engines may be arranged to continue comparing the remaining concept slots regardless of the partial score value.

At block 2110, in one or more of the various embodiments, the concept engine may be arranged to discard the user interface model associated with the low partial score. Next, in one or more of the various embodiments, control may be returned to a calling process.

At block 2112, in one or more of the various embodiments, the concept engine may be arranged to associate the data model match score with the user interface model.

Next, in one or more of the various embodiments, control may be returned to a calling process.

Figure 22:
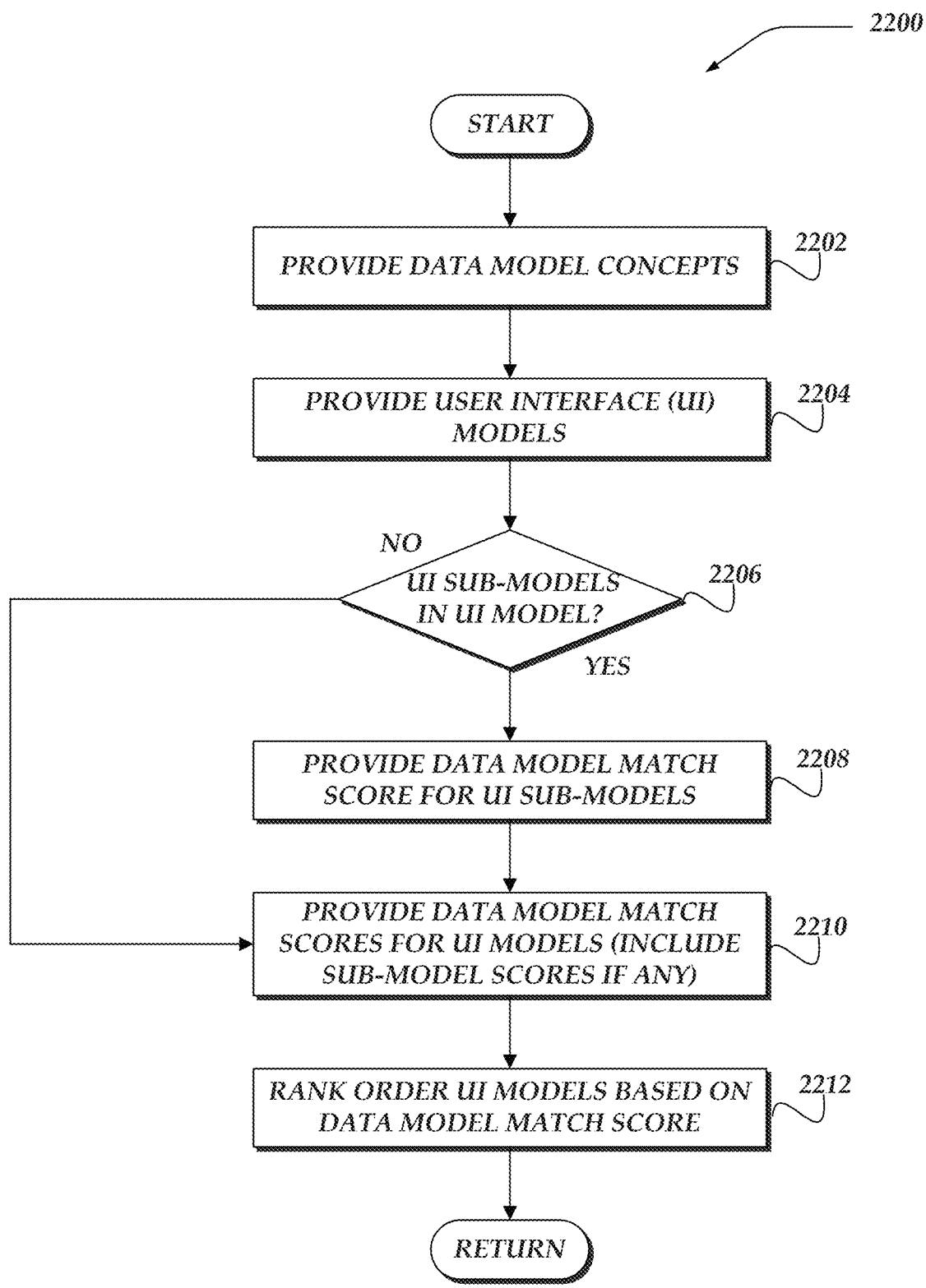
FIG. 22 illustrates a flowchart for a process for scoring user interface models that may be associated with one or more user interface sub-models in accordance with one or more of the various embodiments.

FIG. 22 illustrates a flowchart for process 2200 for scoring user interface models that may be associated with one or more user interface sub-models in accordance with one or more of the various embodiments. After a start block, at block 2202, in one or more of the various embodiments, one or more data model concepts may be provided to a concept engine.

At block 2204, in one or more of the various embodiments, one or more user interface models may be provided to the concept engine.

At decision block 2206, in one or more of the various embodiments, if there may be one or more user interface sub-models associated with the user interface model, control may flow block 2208; otherwise, control may flow to block 2210. As described above, in some embodiments, user interface models that include or embed other user interface models may be considered compound user interface models and the included models may be considered user interface sub-models. Also, in some embodiments, user interface models, such as, dashboard models, may include more than one user interface provider interfaces which generate or correspond different visualizations or user interface portions. In some embodiments, concept engines may be arranged to evaluate dashboard models similar to how compound user interface models may be evaluated. Accordingly, in some embodiments, one or more user interface provider interfaces (e.g., visualizations) in a user interface model may be associated with matching/scoring rules or other criteria that a concept engine may be arranged to evaluate.

At block 2208, in one or more of the various embodiments, the concept engine may be arranged to provide data model match scores for the one or more user interface sub-models. In one or more of the various embodiments, concept engines may be arranged to iterate over the one or more sub-models to provide a sub-score that may be associated with each sub-model. In some embodiments, concept engines may be arranged to evaluate sub-models similar to how "stand-alone" user interface models may be evaluated.

At block 2210, in one or more of the various embodiments, the concept engine may be arranged to provide data model match scores for the compound user interface models that include the scores associated user interface model sub-models, if any.

In some embodiments, concept engines may be arranged to combine the one or more sub-scores into to single score for compound user interface models. Also, in some embodiments, compound user interface models may be arranged to assign or associate more or less importance to one or more of the included sub-models. Accordingly, in some embodiments, if a concept engine computes a match score for a sub-model, it may be modified based on rules included in the compound user interface model.

In one or more of the various embodiments, a user interface model, such as, a dashboard model, may include more than one visualization. Accordingly, in some embodiments, user interface models may be arranged to associate one or more concept slots to one or more attributes of a visualization. For example, a dashboard model that includes two visualizations may associate some concept slots with the first visualization and other concept slots with the second visualization. Accordingly, in some embodiments, concept engines may be arranged to execute match or score rules that evaluate a dashboard model based on how well data model concepts may match with its constituent visualizations.

Further, in some embodiments, match or score rules may be configured to examine if one or more visuzalitions in the user interface model may be satisfied by the data model concepts of the data model. In some embodiments, one or more visualizations in a user interface model may require a minimum set of concept matches to function. Accordingly, in some embodiments, user interface models that include visualizations that were not matched to one or more required concepts may be assigned a reduced match score since they include visualizations that may not work with the data model.

At block 2212, in one or more of the various embodiments, the concept engine may be arranged to rank order the user interface models based on the total data model match score. In one or more of the various embodiments, concept engines may be arranged to apply one or more ranking rules that rank user interface models based on there match scores. In some embodiments, the user interface models with the highest match score may be ranked the highest. Also, in some embodiments, concept engines may be arranged to apply rank rules, or the like, that may exclude one or more user interface models from ranking for various reasons, such as, user is unauthorized to use a user interface model, the match score of one or more user interface models falls below a defined threshold, or the like.

Next, in one or more of the various embodiments, control may be returned to a calling process.

Figure 23:
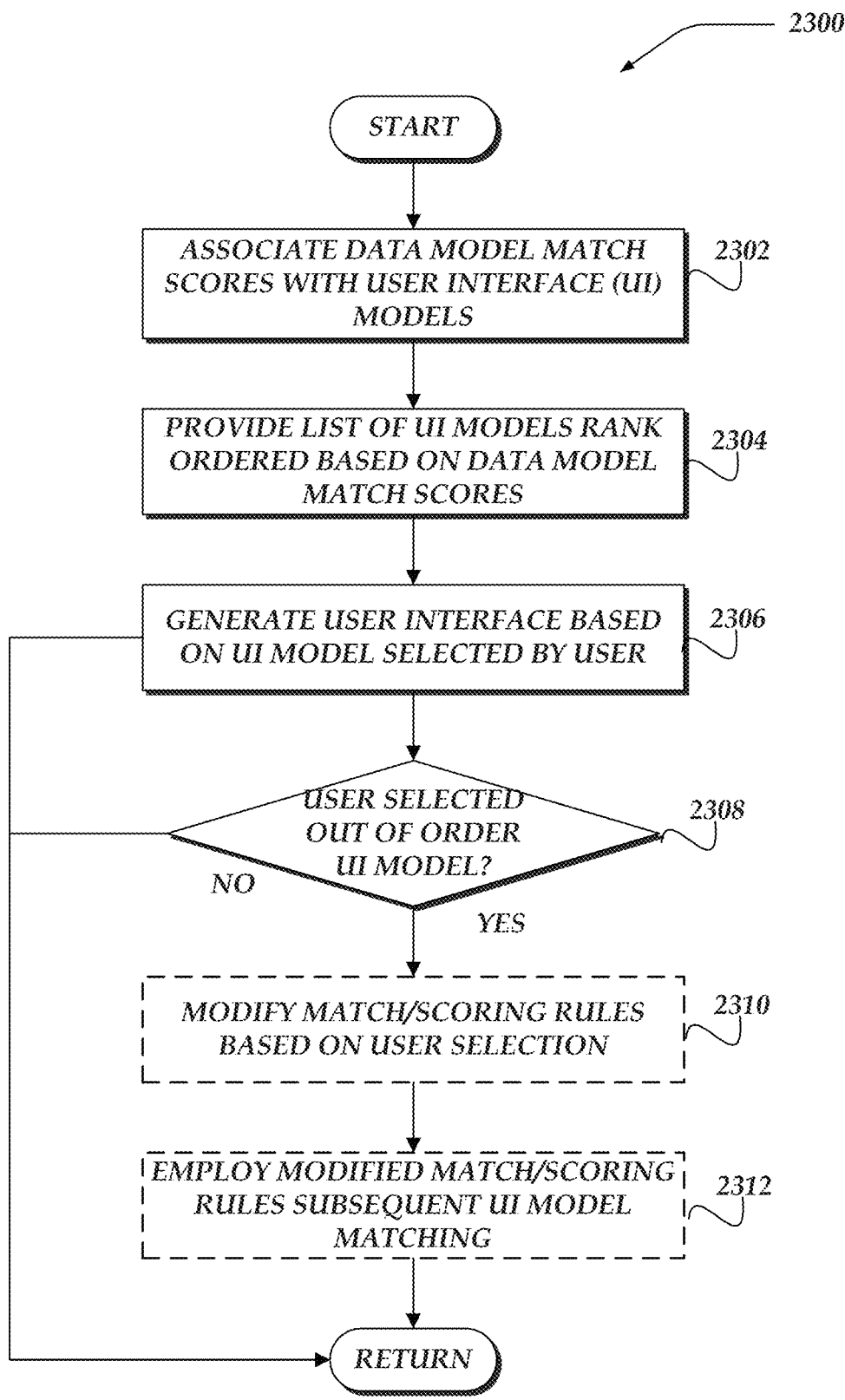
FIG. 23 illustrates a flowchart for a process for generating user interfaces based on scored user interface models in accordance with one or more of the various embodiments.

FIG. 23 illustrates a flowchart for process 2300 for generating user interfaces based on scored user interface models in accordance with one or more of the various embodiments. After a start block, at block 2302, in one or more of the various embodiments, as described above, a concept engine may be arranged to associate data model match scores with one or more user interface models.

At block 2304, in one or more of the various embodiments, the concept engine may be arranged to provide provide a list of user interface models that may be rank ordered based on their respective data model match scores.

At block 2306, in one or more of the various embodiments, a user interface engine may be arranged to generate a user interface based on a user interface model selected by a user. In one or more of the various embodiments, the user interface engine may be arranged to interpret or otherwise process the selected user interface model to generate a user interface that conforms to the selected user interface model. Accordingly, in some embodiments, this may include instantiating one or more visualizations that may be included or defined by the user interface model. In some embodiments, additional user interface features may also be instantiated or rendered based on the user interface model. In some embodiments, these may include styling/aesthetic components, such as, lines, borders, geometry, fonts, colors, or the like. Also, in some embodiments, the additional user interface features may include input components, such as, button controls, list controls, text edit fields, or the like.

In one or more of the various embodiments, during or after the generation of the user interface, the user interface engine may be arranged to populate the one or more visualizations based on data provided via one or more data model fields that may be bound to attributes of the visualizations.

At decision block 2308, in one or more of the various embodiments, if the generated user interface was selected out-of-order, control may flow to block 2308. In some embodiments, if a list of user interface models rank ordered by match score is presented, a user may be enabled to select any user interface model from the list rather than being limited to selecting the user interface model that may be associated with the highest match score. For example, in some embodiments, a user may determine that the highest scoring user interface model may be inappropriate because it is not associated with the desired domain or one or more concepts of interest.

At block 2310, in one or more of the various embodiments, optionally, the concept engine may be arranged to modify the match or scoring rules based on user selection. In one or more of the various embodiments, concept engines may be arranged to evaluate or compare selected user interface model to determine one or more modifications that may be made to match rules that may enable the selected user interface model to receive a match score that may be consistent with the user selection. For example, if the user interface model selected by user is associated with one or more concepts not associated with higher ranked user interface models, it may be appropriate to increase one or more score weights that may be associated those concepts. Accordingly, in one or more of the various embodiments, the match rules or scoring rules that support automated modification may be modified based on feedback provided or collected based on user interaction with the ranked list of user interface models.

In one or more of the various embodiments, the particular modifications that may be available, as well as, the feedback signals that may trigger modifications may vary depending on the match rules or scoring rules. For example, in one or more of the various embodiments, if the match rules are based on machine learning trained classifiers, concept engines may be arranged to initiate re-training of one or more matching classifiers in response to feedback that indicates ranking classifiers could be improved.

This block is marked optional, because concept engines may be arranged to omit this step.

At block 2312, in one or more of the various embodiments, the concept engine may be arranged to employ the modified matching or scoring rules for subsequent user interface model scoring.

This block is marked optional, because concept engines may be arranged to omit this step.

Next, in one or more of the various embodiments, control may be returned to a calling process.

Figure 24:
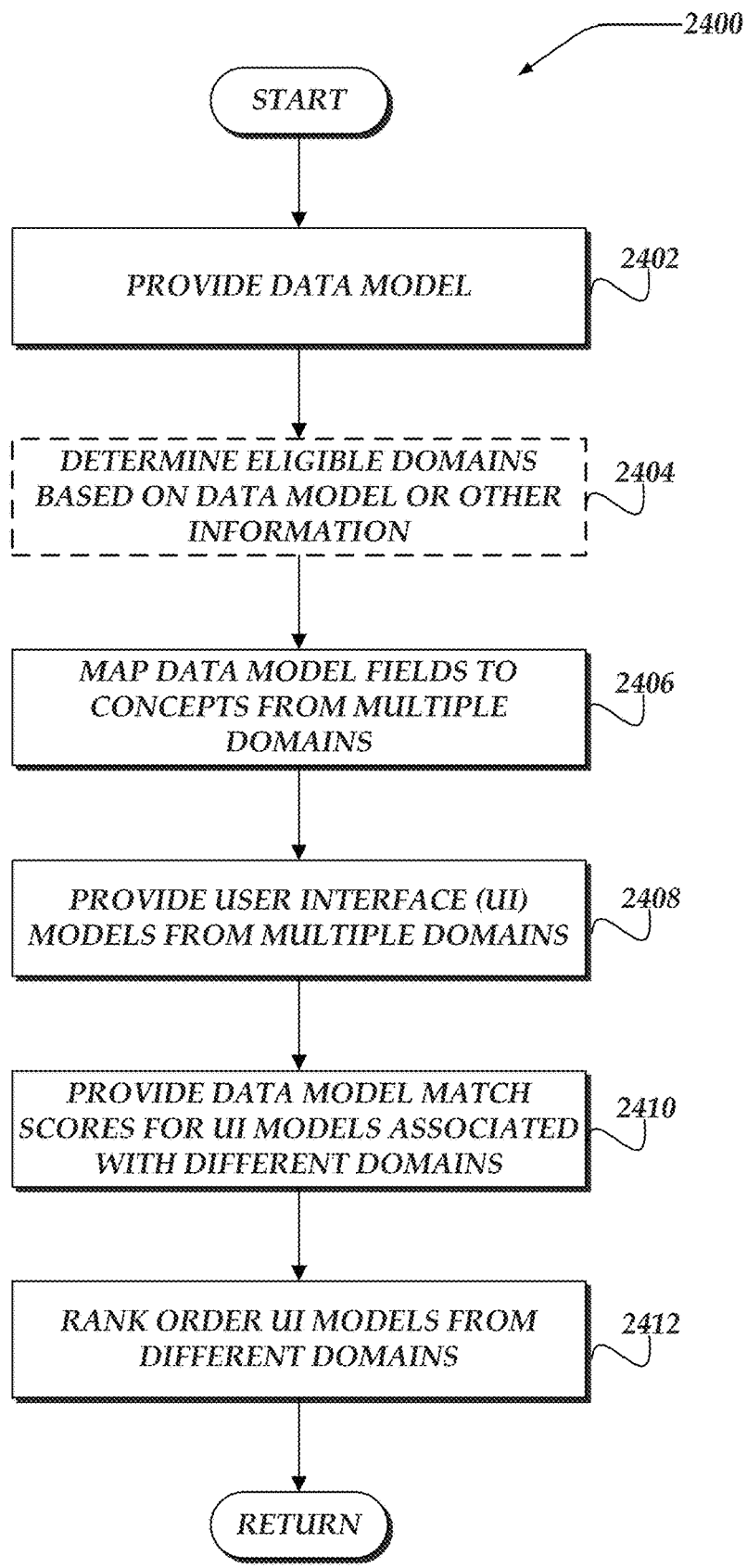
FIG. 24 illustrates a flowchart for a process for matching data source to user interfaces models that may be across different domains in accordance with one or more of the various embodiments.

FIG. 24 illustrates a flowchart for process 2400 for matching data source to user interfaces models that may be across different domains in accordance with one or more of the various embodiments. After a start block, at block 2402, in one or more of the various embodiments, a data model may be provided to a concept engine.

At block 2404, in one or more of the various embodiments, optionally, the concept engine may be arranged to determine one or more eligible domains based on the data model or other information. In one or more of the various embodiments, concept engines may be arranged to include or exclude domains from consideration based on rules or conditions that may be included configuration information. In some embodiments, one or more domains may be predetermined or otherwise well-known to be inappropriate for matching with given data model.

Note, this block is indicated as being optional because concept engines may be arranged to omit this step.

At block 2406, in one or more of the various embodiments, the concept engine may be arranged to map the data model fields to concepts associated with the one or more domains.

At block 2408, in one or more of the various embodiments, the concept engine may be arranged to determine one or more user interface models from one or more different domains. In one or more of the various embodiments, concept engines may be arranged to have access to one or more stores or repositories of user interface models. Accordingly, in one or more of the various embodiments, user interface models may be indexed with information that enables user interface models associated with given domains to be determined by the concept engine.

At block 2410, in one or more of the various embodiments, the concept engine may be arranged to provide data model match scores for the one or more user interface models that may be associated with different domains.

At block 2412, in one or more of the various embodiments, the concept engine may be arranged to rank order the one or more user interface models from different domains based on the data model match scores.

Next, in one or more of the various embodiments, control may be returned to a calling process.

Figure 25:
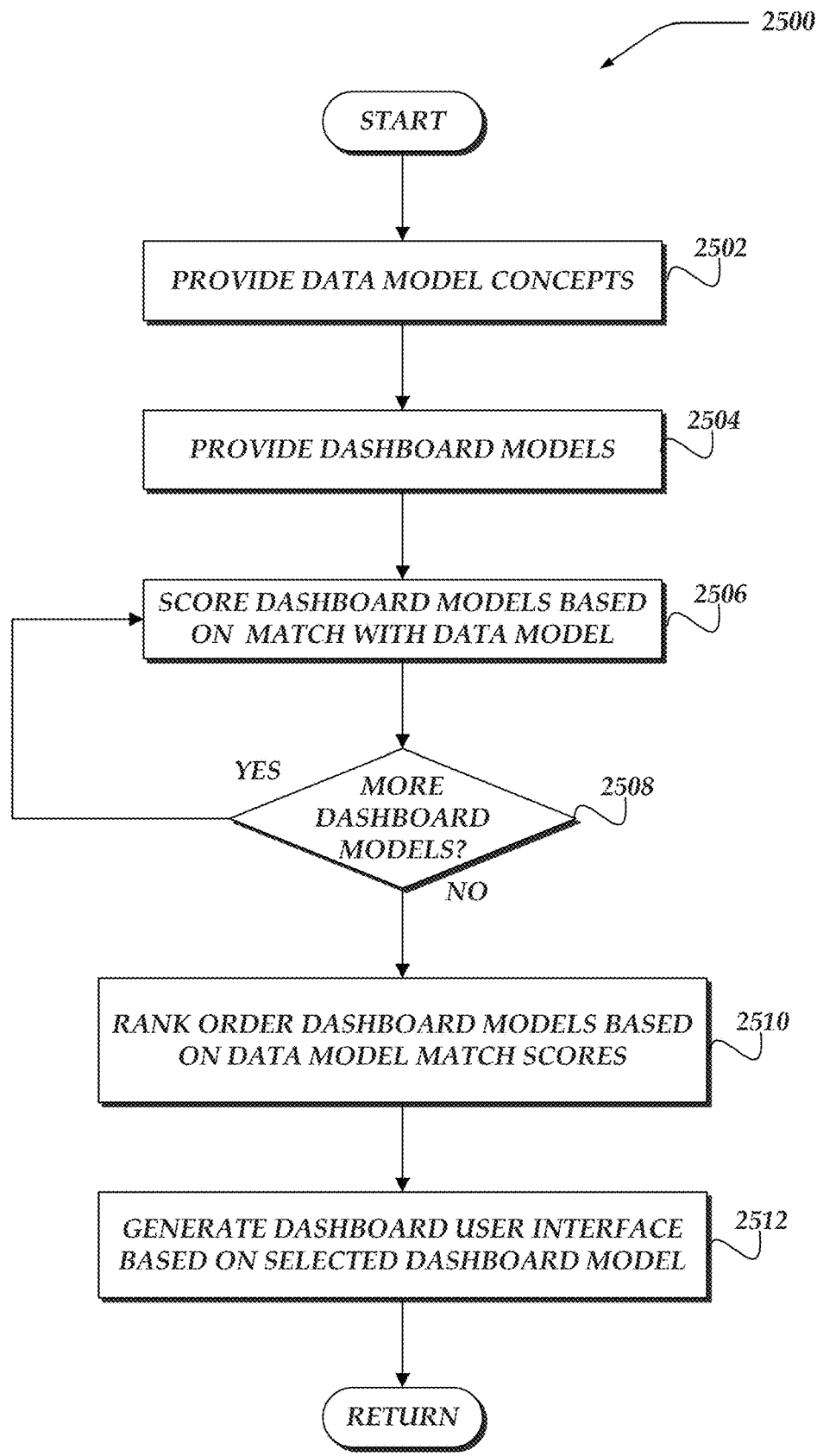
FIG. 25 illustrates a flowchart for a process for matching dashboard user interface models to a data source in accordance with one or more of the various embodiments.

FIG. 25 illustrates a flowchart for process 2500 for matching dashboard models to a data model in accordance with one or more of the various embodiments. After a start block, at block 2502, in one or more of the various embodiments, a concept engine may be arranged to provide one or more data model concepts that may be associated with one or more data models. This may be accomplished by mapping concept to data model fields as described above.

At block 2504, in one or more of the various embodiments, one or more dashboard models may be provided to the concept engine. In one or more of the various embodiments, dashboard model may be considered user interface models that include two or more visualizations that may be associated with different information or metrics that may be related to one or more specific analytical objectives. Also, in some embodiments, dashboard models may be configured to be compound user interface models that include two or more sub-models that may be associated with different information, visualizations, or metrics that may be related to one or more specific analytical objectives.

At block 2506, in one or more of the various embodiments, the concept engine may be arranged to score the dashboard models based how well they match the one or more data models. In one or more of the various embodiments, as described above, dashboard models may be associated with one or more concept slots. In some embodiments, a portion of the concept slots may be associated one or more of the visualizations or if the dashboard model is a compound user interface model, the concept slots may be associated with sub-models.

At decision block 2508, in one or more of the various embodiments, if there may be more dashboard models to score, control may loop back to block 2506; otherwise, control may be flow to block 1510.

At block 2510, in one or more of the various embodiments, the concept engine may be arranged to rank order the one or more dashboard models based on their associated data model match scores.

At block 2512, in one or more of the various embodiments, a user interface engine may be arranged to generate a dashboard user interface based on a selected dashboard model.

Next, in one or more of the various embodiments, control may be returned to a calling process.

Figure 26:
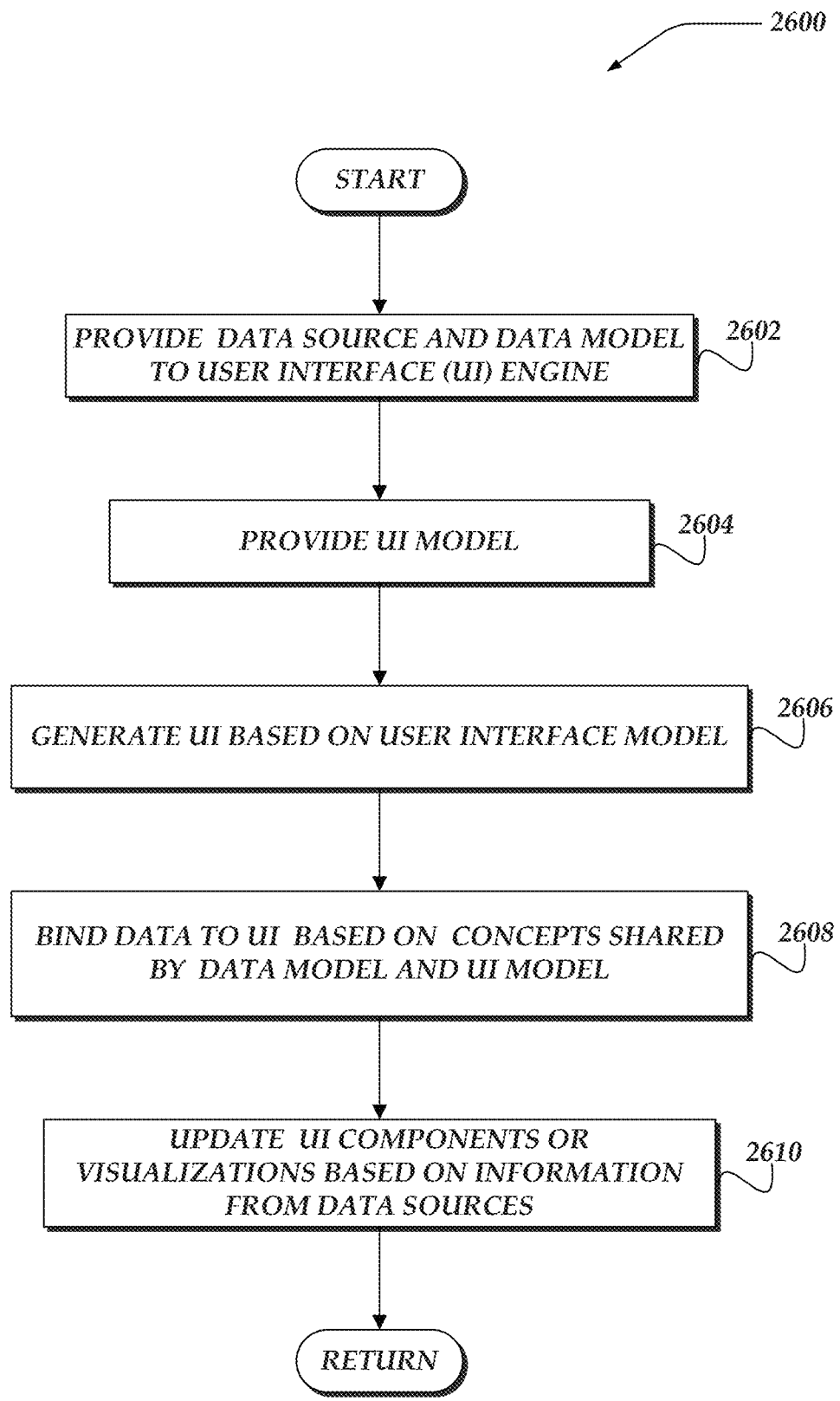
FIG. 26 illustrates a flowchart for a process for generating a user interface based on a data model and a user interfaces models in accordance with one or more of the various embodiments.

FIG. 26 illustrates a flowchart for process 2600 for generating a user interface based on a data model and a user interfaces models in accordance with one or more of the various embodiments. After a start block, at block 2602, in one or more of the various embodiments, a user interface engine may be provided a data source that may be associated one or more data models. In one or more of the various embodiments, data sources may provide information that may be displayed in a user interface. In some embodiments, the user interface engine may be arranged to access a data source directly. In other embodiments, the user interface engine may be arranged to employ a data model or one or more interfaces to the data source that conform to the data model for accessing the information stored or provided by a data source.

At block 2604, in one or more of the various embodiments, a user interface model may be provided to the user interface engine. In some embodiments, a user may be enabled to select a user interface model from list of user interface models that may be ranked ordered based on matching scores. In other embodiments, a user interface engine may be arranged to automatically select the highest ranked user interface model.

At block 2606, in one or more of the various embodiments, the user interface engine may be arranged to generate a user interface based on the user interface model. Accordingly, in one or more of the various embodiments, the user interface engine may be arranged to interpret or otherwise process the selected user interface model to generate a user interface that conforms to the selected user interface model. Accordingly, in some embodiments, this may include instantiating one or more visualizations that may be included or defined by the user interface model. In some embodiments, additional user interface features may also be instantiated or rendered based on the user interface model. In some embodiments, these may include styling/aesthetic components, such as, lines, borders, geometry, fonts, colors, or the like. Also, in some embodiments, the additional user interface features may include input components, such as, button controls, list controls, text edit fields, or the like.

At block 2608, in one or more of the various embodiments, the user interface engine may be arranged to bind the data source to the user interface based on the concepts shared by the data model and the user interface model. As described above, in one or more of the various embodiments, user interface model may be associated with one or more concept slots that may be associated with the data model concepts that have been mapped to the data model fields of the data model. Further, in some embodiments, user interface models may be arranged to associate one or more of the concept slots with one or more attributes that determine various features of the visualizations in a user interface model. For example, as described above, a data model field named sales_revenue may be mapped to a data model concept named revenue. And, continuing with this example, the user interface model may have a concept slot that may be associated with the concept revenue. Thus, in this example, one or more attributes of a visualization in the user interface model may be associated with the revenue concept slot on the user interface model. Accordingly, for this example, the user interface engine may be arranged to trace a logical path from the sales_revenue data model field to the visualization attribute to establish a binding with the underlying data source.

In one or more of the various embodiments, the actual data binding mechanism may vary depending on the type of data source or data model. Also, in some embodiments, data binding may require additional credentials or authorizations to establish a connection or otherwise access to the data source. Accordingly, in some embodiments, user interface engines may be arranged to provide additional user interfaces that enable users to provide the appropriate or required authorization information for a data source. In some embodiments, user interface engines may obtain the required authorization information from configuration information.

At block 2610, in one or more of the various embodiments, the user interface engine may be arranged to update one or more components of the user interface based on information provided by the data source.

In one or more of the various embodiments, the user interface engine may be arranged to obtain or receive data from the data source. In some embodiments, features of the underlying data source may determine how data may be obtained. For example, in some embodiments, the user interface engine may be arranged to issue or execute queries to obtain the data. In other embodiments, a data source may be streaming real-time telemetry that may be pushed continuously to the user interface engine for display.

Next, in one or more of the various embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware-based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing user interfaces using one or more processors that execute instructions to perform actions, comprising:
    providing one or more user interface (UI) models that are each associated with one or more concepts having one or more characteristics, wherein the one or more UI models include one or more visualizations;
    associating one or more other concepts having the one or more characteristics with a data model based on one or more fields of the data model;
    comparing the one or more characteristics of the one or more concepts associated with each UI model and the one or more other concepts associated with the data model to each other, wherein one or more results of each comparison is employed to generate a score for each of the one or more UI models;
    ordering the one or more UI models based on each score; and
    providing a report that includes a rank ordered list of the one or more UI models.

2. The method of claim 1, wherein associating the one or more concepts with the data model, further comprises:
    comparing each field of the data model to a plurality of concepts based on one or more characteristics of each field, wherein the one or more characteristics, include one or more of a label of a field, or a data type of a field; and
    associating a concept associated with the comparison to a compared field associated with the comparison of each field.

3. The method of claim 1, further comprising:
determining a UI model based on the ordering of the one or more UI models; and
instantiating a UI engine to perform actions, including:
  generating a UI based on the determined UI model;
  binding a portion of the one or more fields of the data model to one or more attributes of the one or more visualizations based on a concept associated with each of the portion of the one or more fields, wherein the concept is also associated with one or more slots in the UI model that correspond to the one or more attributes; and
  rendering the one or more visualizations for display in the UI based on the data model, wherein the one or more attributes are populated using information from the data source that is associated with the portion of the one or more fields.

4. The method of claim 1, wherein providing the one or more UI models, further comprises,
providing one or more dashboard models that each include one or more of one or more visualizations or one or more UI sub-models, wherein the one or more visualizations or the one or more UI sub-models are associated with different information or metrics that are further associated with one or more specific analytical objectives.

5. The method of claim 1, further comprising:
providing one or more compound UI models that each include one or more UI sub-models;
providing a sub-score for each of the one or more UI sub-models based on a comparison of each concept associated with each UI sub-model and the one or more other concepts associated with the data model; and
providing the score for the one or more compound UI models based on the one or more sub-scores.

6. The method of claim 1, wherein providing the one or more UI models, further comprises:
providing one or more domains that are associated with one or more domain concepts;
associating each of the one or more UI models with one or more of the one or more domains; and
associating the one or more UI models with a portion of the one or more domain concepts based on the one or more domains that are associated with the one or more UI models.

7. The method of claim 1, wherein generating the score for each of the one or more UI models further comprises:
determining a first portion of the score based on a cardinality of an intersection of one or more unique concepts shared by the one or more data models and the one or more UI models;
determining a second portion of the score based on a normalized measure of an intersection between the one or more other concepts associated with the data model and the one or more concepts associated with each UI model; and
determining a third portion of the score based on a number of visualizations or a number of UI sub-models in the one or more UI models that correspond to the one or more other concepts associated with the data model.

8. The method of claim 1, further comprising:
associating a weight value with the one or more concepts based on a relative importance of the one or more concepts;
associating a portion of the one or more concepts with the one or more visualizations; and
instantiating a UI engine to perform actions, including:
  generating a UI that styles one or more of a position, appearance or geometry of the one or more visualizations in the UI based on the weight value that is associated with each of the portion of the one or more concepts.

9. A processor readable non-transitory storage media that includes instructions for managing user interfaces, wherein execution of the instructions by one or more processors, performs actions, comprising:
providing one or more user interface (UI) models that are each associated with one or more concepts having one or more characteristics, wherein the one or more UI models include one or more visualizations;
associating one or more other concepts having the one or more characteristics with a data model based on one or more fields of the data model;
comparing the one or more characteristics of the one or more concepts associated with each UI model and the one or more other concepts associated with the data model to each other, wherein one or more results of each comparison is employed to generate a score for each of the one or more UI models;
ordering the one or more UI models based on each score; and
providing a report that includes a rank ordered list of the one or more UI models.

10. The media of claim 9, wherein associating the one or more concepts with the data model, further comprises:
comparing each field of the data model to a plurality of concepts based on one or more characteristics of each field, wherein the one or more characteristics, include one or more of a label of a field, or a data type of a field; and
associating a concept associated with the comparison to a compared field associated with the comparison of each field.

11. The media of claim 9, further comprising:
determining a UI model based on the ordering of the one or more UI models; and
instantiating a UI engine to perform actions, including:
  generating a UI based on the determined UI model;
  binding a portion of the one or more fields of the data model to one or more attributes of the one or more visualizations based on a concept associated with each of the portion of the one or more fields, wherein the concept is also associated with one or more slots in the UI model that correspond to the one or more attributes; and
  rendering the one or more visualizations for display in the UI based on the data model, wherein the one or more attributes are populated using information from the data source that is associated with the portion of the one or more fields.

12. The media of claim 9, wherein providing the one or more UI models, further comprises,
providing one or more dashboard models that each include one or more of one or more visualizations or one or more UI sub-models, wherein the one or more visualizations or the one or more UI sub-models are associated with different information or metrics that are further associated with one or more specific analytical objectives.

13. The media of claim 9, further comprising:
providing one or more compound UI models that each include one or more UI sub-models;
providing a sub-score for each of the one or more UI sub-models based on a comparison of each concept associated with each UI sub-model and the one or more other concepts associated with the data model; and providing the score for the one or more compound UI models based on the one or more sub-scores.

14. The media of claim 9, wherein providing the one or more UI models, further comprises:
providing one or more domains that are associated with one or more domain concepts;
associating each of the one or more UI models with one or more of the one or more domains; and
associating the one or more UI models with a portion of the one or more domain concepts based on the one or more domains that are associated with the one or more UI models.

15. The media of claim 9, wherein generating the score for each of the one or more UI models further comprises:
determining a first portion of the score based on a cardinality of an intersection of one or more unique concepts shared by the one or more data models and the one or more UI models;
determining a second portion of the score based on a normalized measure of an intersection between the one or more other concepts associated with the data model and the one or more concepts associated with each UI model; and
determining a third portion of the score based on a number of visualizations or a number of UI sub-models in the one or more UI models that correspond to the one or more other concepts associated with the data model.

16. The media of claim 9, further comprising:
associating a weight value with the one or more concepts based on a relative importance of the one or more concepts;
associating a portion of the one or more concepts with the one or more visualizations; and
instantiating a UI engine to perform actions, including:
generating a UI that styles one or more of a position, appearance or geometry of the one or more visualizations in the UI based on the weight value that is associated with each of the portion of the one or more concepts.

17. A system for managing user interfaces:
a network computer, comprising:
a transceiver that communicates over the network;
a memory that stores at least instructions; and
one or more processors that execute instructions that perform actions, including:
providing one or more user interface (UI) models that are each associated with one or more concepts having one or more characteristics, wherein the one or more UI models include one or more visualizations;
associating one or more other concepts having the one or more characteristics with a data model based on one or more fields of the data model;
comparing the one or more characteristics of the one or more concepts associated with each UI model and the one or more other concepts associated with the data model to each other, wherein one or more results of each comparison is employed to generate a score for each of the one or more UI models;
ordering the one or more UI models based on each score; and
providing a report that includes a rank ordered list of the one or more UI models; and a client computer, comprising:
a transceiver that communicates over the network;
a memory that stores at least instructions; and
one or more processors that execute instructions that perform actions, including:
receiving the report.

18. The system of claim 17, wherein associating the one or more concepts with the data model, further comprises:
comparing each field of the data model to a plurality of concepts based on one or more characteristics of each field, wherein the one or more characteristics, include one or more of a label of a field, or a data type of a field; and
associating a concept associated with the comparison to a compared field associated with the comparison of each field.

19. The system of claim 17, wherein the one or more processors of the network computer execute instructions that perform actions, further comprising:
determining a UI model based on the ordering of the one or more UI models; and
instantiating a UI engine to perform actions, including:
generating a UI based on the determined UI model;
binding a portion of the one or more fields of the data model to one or more attributes of the one or more visualizations based on a concept associated with each of the portion of the one or more fields, wherein the concept is also associated with one or more slots in the UI model that correspond to the one or more attributes; and
rendering the one or more visualizations for display in the UI based on the data model, wherein the one or more attributes are populated using information from the data source that is associated with the portion of the one or more fields.

20. The system of claim 17, wherein providing the one or more UI models, further comprises,
providing one or more dashboard models that each include one or more of one or more visualizations or one or more UI sub-models, wherein the one or more visualizations or the one or more UI sub-models are associated with different information or metrics that are further associated with one or more specific analytical objectives.

21. The system of claim 17, wherein the one or more processors of the network computer execute instructions that perform actions, further comprising:
providing one or more compound UI models that each include one or more UI sub-models;
providing a sub-score for each of the one or more UI sub-models based on a comparison of each concept associated with each UI sub-model and the one or more other concepts associated with the data model; and
providing the score for the one or more compound UI models based on the one or more sub-scores.

22. The system of claim 17, wherein providing the one or more UI models, further comprises:
providing one or more domains that are associated with one or more domain concepts;
associating each of the one or more UI models with one or more of the one or more domains; and
associating the one or more UI models with a portion of the one or more domain concepts based on the one or more domains that are associated with the one or more UI models.

23. The system of claim 17, wherein generating the score for each of the one or more UI models further comprises:

determining a first portion of the score based on a cardinality of an intersection of one or more unique concepts shared by the one or more data models and the one or more UI models;

determining a second portion of the score based on a normalized measure of an intersection between the one or more other concepts associated with the data model and the one or more concepts associated with each UI model; and determining a third portion of the score based on a number of visualizations or a number of UI sub-models in the one or more UI models that correspond to the one or more other concepts associated with the data model.

24. The system of claim 17, wherein the one or more processors of the network computer execute instructions that perform actions, further comprising:

associating a weight value with the one or more concepts based on a relative importance of the one or more concepts;

associating a portion of the one or more concepts with the one or more visualizations; and instantiating a UI engine to perform actions, including:
generating a UI that styles one or more of a position, appearance or geometry of the one or more visualizations in the UI based on the weight value that is associated with each of the portion of the one or more concepts.

25. A network computer for managing user interfaces, comprising:

a transceiver that communicates over the network;
a memory that stores at least instructions; and
one or more processors that execute instructions that perform actions, including:

providing one or more user interface (UI) models that are each associated with one or more concepts having one or more characteristics, wherein the one or more UI models include one or more visualizations;

associating one or more other concepts having the one or more characteristics with a data model based on one or more fields of the data model;

comparing the one or more characteristics of the one or more concepts associated with each UI model and the one or more other concepts associated with the data model to each other, wherein one or more results of each comparison is employed to generate a score for each of the one or more UI models;

ordering the one or more UI models based on each score; and providing a report that includes a rank ordered list of the one or more UI models.

26. The network computer of claim 25, wherein associating the one or more concepts with the data model, further comprises:

comparing each field of the data model to a plurality of concepts based on one or more characteristics of each field, wherein the one or more characteristics, include one or more of a label of a field, or a data type of a field; and associating a concept associated with the comparison to a compared field associated with the comparison of each field.

27. The network computer of claim 25, wherein the one or more processors execute instructions that perform actions, further comprising:

determining a UI model based on the ordering of the one or more UI models; and instantiating a UI engine to perform actions, including:
generating a UI based on the determined UI model;
binding a portion of the one or more fields of the data model to one or more attributes of the one or more visualizations based on a concept associated with each of the portion of the one or more fields, wherein the concept is also associated with one or more slots in the UI model that correspond to the one or more attributes; and rendering the one or more visualizations for display in the UI based on the data model, wherein the one or more attributes are populated using information from the data source that is associated with the portion of the one or more fields.

28. The network computer of claim 25, wherein providing the one or more UI models, further comprises, providing one or more dashboard models that each include one or more of one or more visualizations or one or more UI sub-models, wherein the one or more visualizations or the one or more UI sub-models are associated with different information or metrics that are further associated with one or more specific analytical objectives.

29. The network computer of claim 25, wherein the one or more processors execute instructions that perform actions, further comprising:

providing one or more compound UI models that each include one or more UI sub-models;

providing a sub-score for each of the one or more UI sub-models based on a comparison of each concept associated with each UI sub-model and the one or more other concepts associated with the data model; and providing the score for the one or more compound UI models based on the one or more sub-scores.

30. The network computer of claim 25, wherein providing the one or more UI models, further comprises:

providing one or more domains that are associated with one or more domain concepts;

associating each of the one or more UI models with one or more of the one or more domains; and associating the one or more UI models with a portion of the one or more domain concepts based on the one or more domains that are associated with the one or more UI models.

31. The network computer of claim 25, wherein generating the score for each of the one or more UI models further comprises:

determining a first portion of the score based on a cardinality of an intersection of one or more unique concepts shared by the one or more data models and the one or more UI models;

determining a second portion of the score based on a normalized measure of an intersection between the one or more other concepts associated with the data model and the one or more concepts associated with each UI model; and determining a third portion of the score based on a number of visualizations or a number of UI sub-models in the one or more UI models that correspond to the one or more other concepts associated with the data model.

32. The network computer of claim 25, wherein the one or more processors execute instructions that perform actions, further comprising:

associating a weight value with the one or more concepts based on a relative importance of the one or more concepts;

associating a portion of the one or more concepts with the one or more visualizations; and instantiating a UI engine to perform actions, including:
generating a UI that styles one or more of a position, appearance or geometry of the one or more visualizations in the UI based on the weight value that is associated with each of the portion of the one or more concepts.

\* \* \* \* \*